US012069515B2

(12) United States Patent
Tonesi et al.

(10) Patent No.: US 12,069,515 B2
(45) Date of Patent: Aug. 20, 2024

(54) TECHNIQUES FOR MANAGING ACCESS COMBINATIONS FOR MULTIPLE ACCESS PROTOCOL DATA UNIT SESSIONS

(71) Applicant: QUALCOMM Incorporated, San Diego, CA (US)

(72) Inventors: Dario Serafino Tonesi, Berlin (DE); Waqar Zia, Munich (DE); Amer Catovic, San Diego, CA (US); Lenaig Genevieve Chaponniere, La Jolla, CA (US); Stefano Faccin, San Ysidro, CA (US); Ajith Tom Payyappilly, San Diego, CA (US); Sunghoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/545,850

(22) Filed: Dec. 8, 2021

(65) Prior Publication Data

US 2023/0180057 A1   Jun. 8, 2023

(51) Int. Cl.
*H04W 28/02* (2009.01)
*H04W 28/08* (2023.01)
*H04W 28/12* (2009.01)

(52) U.S. Cl.
CPC ....... *H04W 28/12* (2013.01); *H04W 28/0273* (2013.01); *H04W 28/0933* (2020.05)

(58) Field of Classification Search
CPC ............. H04W 28/02; H04W 28/0273; H04W 28/0933; H04W 28/10; H04W 28/12; H04W 76/11; H04W 88/18
See application file for complete search history.

(56) References Cited

U.S. PATENT DOCUMENTS

2019/0306752 A1* 10/2019 Lai .................... H04W 28/0925
2019/0394833 A1* 12/2019 Talebi Fard ........ H04W 68/005
(Continued)

FOREIGN PATENT DOCUMENTS

WO   WO-2021128090 A1   7/2021
WO   WO-2021155090 A1   8/2021

OTHER PUBLICATIONS

3GPP TS 23.501: "3rd Generation Partnership Project, Technical Specification Group Services and System Aspects, System Architecture for the 5G System (5GS), Stage 2 (Release 17)", 3GPP TS 23.501, V17.2.0, Draft_Interim_23501-H20_S2-147E_CRS_Implem Ented, Mobile Competence Centre, ETSI , 650, Route Des Lucioles, F-06921 Sophia-Antipolis Cedex, France, pp. 1-548 , Nov. 3, 2021, XP052087234, Paragraph 5.32.2, 5.32.3, 5.32.6.
(Continued)

*Primary Examiner* — Alpus Hsu
(74) *Attorney, Agent, or Firm* — Dalei Dong; Holland & Hart LLP

(57) ABSTRACT

Techniques for managing access combinations for multiple access protocol data unit (PDU) sessions are described. A communication device may receive control signaling indicating a configuration for a multiple access PDU session associated with a plurality of access links. The plurality of access links may be associated with a first type of access, a second type of access, or a combination thereof. The communication device may select a mode for allocation of a data flow associated with the multiple access PDU session to the plurality of access links based at least in part on the received control signaling. The communication device may allocate the data flow associated with the multiple access PDU session to the plurality of access links based at least in part on the selected mode, and transmit the allocated data flow
(Continued)

over the plurality of access links associated with the two types of access.

30 Claims, 18 Drawing Sheets

(56) References Cited

U.S. PATENT DOCUMENTS

| | | | |
|---|---|---|---|
| 2020/0404552 A1* | 12/2020 | Huang-Fu | H04W 28/0268 |
| 2020/0404609 A1* | 12/2020 | Huang-Fu | H04W 76/15 |
| 2021/0007166 A1* | 1/2021 | Liao | H04W 48/16 |
| 2021/0022203 A1* | 1/2021 | Kang | H04W 8/08 |
| 2021/0037585 A1* | 2/2021 | Youn | H04W 76/30 |
| 2021/0092664 A1* | 3/2021 | Lai | H04W 60/04 |
| 2021/0251036 A1* | 8/2021 | Shi | H04W 76/30 |
| 2021/0368373 A1* | 11/2021 | Youn | H04W 76/16 |
| 2021/0410010 A1* | 12/2021 | Salkintzis | H04W 76/10 |
| 2022/0104075 A1* | 3/2022 | Lin | H04W 60/005 |
| 2022/0116822 A1* | 4/2022 | Sahin | H04W 28/0835 |
| 2022/0124838 A1* | 4/2022 | Lin | H04W 28/10 |
| 2022/0132454 A1* | 4/2022 | Youn | H04W 60/00 |
| 2022/0182861 A1* | 6/2022 | Youn | H04W 28/10 |
| 2022/0264508 A1* | 8/2022 | Tonesi | H04W 76/16 |
| 2022/0279384 A1* | 9/2022 | Sugawara | H04W 48/18 |
| 2022/0361272 A1* | 11/2022 | Sugawara | H04W 76/12 |
| 2023/0056442 A1* | 2/2023 | Ly | H04W 24/08 |
| 2023/0070882 A1* | 3/2023 | Youn | H04L 65/1016 |
| 2023/0071408 A1* | 3/2023 | Kim | H04L 65/1104 |
| 2023/0132058 A1* | 4/2023 | Youn | H04L 12/14 370/329 |
| 2023/0300674 A1* | 9/2023 | Kedalagudde | H04W 24/10 370/230.1 |

OTHER PUBLICATIONS

Intel: "Solution of ATSSS Rule in URSP", SA WG2 Meeting #S2-127BIS, S2-185243, 3rd Generation Partnership Project (3GPP), Mobile Competence Centre, 650, Route Des Luciqles, F-06921, Sophia-Antipolis Cedex, France, vol. SA WG2, May 27, 2018, pp. 1-5, XP051448742, The Whole Document.

International Search Report and Written Opinion—PCT/US2022/079816—ISA/EPO—Mar. 3, 2023 (2200591WO).

* cited by examiner

TECHNIQUES FOR MANAGING ACCESS COMBINATIONS FOR MULTIPLE ACCESS PROTOCOL DATA UNIT SESSIONS

FIELD OF DISCLOSURE

The present disclosure relates to wireless communication, including to techniques for managing access combinations for multiple access protocol data unit (PDU) sessions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device to support techniques for managing access combinations for multiple access sessions. For example, a communication device, such as a UE, may receive control signaling indicating a configuration (e.g., including one or more access traffic steering, switching, splitting (ATSSS) rules) for a multiple access session associated with two or more access links. Additionally, the two or more access links may be associated with a first type of access, a second type of access, or a combination thereof. Examples of a first type of access (also referred to as a 3GPP access) may include LTE, LTE-A, LTE-A Pro, or NR, and a second type of access (also referred to as a non-3GPP access) may include Institute of Electrical and Electronics Engineers (IEEE) 802.11 (Wi-Fi), Wireline 5G access, or a combination thereof. Based on the received control signaling, the communication device may be configured (e.g., according to the one or more ATSSS rules) to manage access combinations for a multiple access session over two or more access links, which may have any combination of the above types of access. As a result, the communication device may effectively and efficiently manage access combinations for multiple access sessions to increase energy saving at the communication device.

A method for wireless communication at a device is described. The method may include receiving control signaling indicating a configuration for a multiple access PDU session associated with a set of multiple access links, the set of multiple access links associated with a first type of access, a second type of access, or a combination thereof, selecting a mode for allocation of a data flow associated with the multiple access PDU session to the set of multiple access links based on the received control signaling, allocating the data flow associated with the multiple access PDU session to the set of multiple access links based on the selected mode, and transmitting the allocated data flow over the set of multiple access links associated with the two types of access.

An apparatus for wireless communication at a device is described. The apparatus may include a processor, memory coupled with the processor, and instructions stored in the memory. The instructions may be executable by the processor to cause the apparatus to receive control signaling indicating a configuration for a multiple access PDU session associated with a set of multiple access links, the set of multiple access links associated with a first type of access, a second type of access, or a combination thereof, select a mode for allocation of a data flow associated with the multiple access PDU session to the set of multiple access links based on the received control signaling, allocate the data flow associated with the multiple access PDU session to the set of multiple access links based on the selected mode, and transmit the allocated data flow over the set of multiple access links associated with the two types of access.

Another apparatus for wireless communication at a device is described. The apparatus may include means for receiving control signaling indicating a configuration for a multiple access PDU session associated with a set of multiple access links, the set of multiple access links associated with a first type of access, a second type of access, or a combination thereof, means for selecting a mode for allocation of a data flow associated with the multiple access PDU session to the set of multiple access links based on the received control signaling, means for allocating the data flow associated with the multiple access PDU session to the set of multiple access links based on the selected mode, and means for transmitting the allocated data flow over the set of multiple access links associated with the two types of access.

A non-transitory computer-readable medium storing code for wireless communication at a device is described. The code may include instructions executable by a processor to receive control signaling indicating a configuration for a multiple access PDU session associated with a set of multiple access links, the set of multiple access links associated with a first type of access, a second type of access, or a combination thereof, select a mode for allocation of a data flow associated with the multiple access PDU session to the set of multiple access links based on the received control signaling, allocate the data flow associated with the multiple access PDU session to the set of multiple access links based on the selected mode, and transmit the allocated data flow over the set of multiple access links associated with the two types of access.

Some examples of the method, apparatuses, and non-transitory computer-readable medium described herein may further include operations, features, means, or instructions for determining a first access link and a second access link of the set of multiple access links associated with the first type of access based on the received control signaling, identifying a status of each of the first access link and the second access link associated with the first type of access, where the status includes an active status or a standby status, and where allocating the data flow associated with the multiple access PDU session may be further based on the identified status of each of the first access link and the second access link associated with the first type of access.

In some examples of the method, apparatuses, and non-transitory computer-readable medium described herein, the first access link or the second access link associated with the first type of access includes the active status and the method, apparatuses, and non-transitory computer-readable medium may include further operations, features, means, or instructions for determining a lack of a respective access link of the set of multiple access links including the standby status.

In some examples of the method, apparatuses, and non-transitory computer-readable medium described herein, the first access link associated with the first type of access includes the active status, and where the second access link associated with the first type of access includes the standby status and the second access link associated with the first type of access includes the active status, and where the first access link associated with the first type of access includes the standby status.

Some examples of the method, apparatuses, and non-transitory computer-readable medium described herein may further include operations, features, means, or instructions for determining a first access link and a second access link of the set of multiple access links associated with the second type of access based on the received control signaling, identifying a status of each of the first access link and the second access link associated with the second type of access, where the status includes an active status or a standby status, and where allocating the data flow associated with the multiple access PDU session may be further based on the identified status of each of the first access link and the second access link associated with the second type of access.

In some examples of the method, apparatuses, and non-transitory computer-readable medium described herein, the first access link or the second access link associated with the second type of access includes the active status and the method, apparatuses, and non-transitory computer-readable medium may include further operations, features, means, or instructions for determining a lack of a respective access link of the set of multiple access links including the standby status.

In some examples of the method, apparatuses, and non-transitory computer-readable medium described herein, the first access link associated with the second type of access includes the active status, and where the second access link associated with the second type of access includes the standby status and the first access link associated with the second type of access includes the active status, and where the second access link associated with the second type of access includes the standby status.

Some examples of the method, apparatuses, and non-transitory computer-readable medium described herein may further include operations, features, means, or instructions for determining, based on the received control signaling, a first access link associated with the first type of access, and a second access link and a third access link associated with the second type of access, identifying a status of each of the first access link associated with the first type of access and the second access link and the third access link associated with the second type of access, where the status includes an active status or a standby status, and where allocating the data flow associated with the multiple access PDU session may be further based on the status of each the first access link, the second access link, and the third access link.

In some examples of the method, apparatuses, and non-transitory computer-readable medium described herein, the first access link associated with the first type of access includes the active status and the second access link or the third access link associated with the second type of access, or both include the standby status.

In some examples of the method, apparatuses, and non-transitory computer-readable medium described herein, the second access link associated with the second type of access includes the active status and the method, apparatuses, and non-transitory computer-readable medium may include further operations, features, means, or instructions for determining a lack of a respective access link of the set of multiple access links including the standby status.

In some examples of the method, apparatuses, and non-transitory computer-readable medium described herein, the second access link associated with the second type of access includes the active status and the first access link associated with the first type of access or the third access link associated with the second type of access, or both include the standby status.

In some examples of the method, apparatuses, and non-transitory computer-readable medium described herein, the third access link associated with the second type of access includes the active status and the method, apparatuses, and non-transitory computer-readable medium may include further operations, features, means, or instructions for determining a lack of a respective access link of the set of multiple access links including the standby status.

In some examples of the method, apparatuses, and non-transitory computer-readable medium described herein, the third access link associated with the second type of access includes the active status and the first access link associated with the first type of access or the second access link associated with the second type of access, or both include the standby status.

Some examples of the method, apparatuses, and non-transitory computer-readable medium described herein may further include operations, features, means, or instructions for determining a first access link and a second access link of the set of multiple access links associated with the first type of access based on the received control signaling, identifying, based on the configuration, a first data flow allocation percentage for the first access link associated with the first type of access and a second data flow allocation percentage for the second access link associated with the first type of access, and where allocating the data flow associated with the multiple access PDU session may be further based on the identified first data flow allocation percentage for the first access link associated with the first type of access and the identified second data flow allocation percentage for the second access link associated with the first type of access.

In some examples of the method, apparatuses, and non-transitory computer-readable medium described herein, the first data flow allocation percentage may be greater than or equal to the second data flow allocation percentage and the first data flow allocation percentage may be less than or equal to the second data flow allocation percentage.

Some examples of the method, apparatuses, and non-transitory computer-readable medium described herein may further include operations, features, means, or instructions for determining a first access link and a second access link of the set of multiple access links associated with the second type of access based on the received control signaling, identifying, based on the configuration, a first data flow allocation percentage for the first access link associated with the second type of access and a second data flow allocation percentage for the second access link associated with the second type of access, and where allocating the data flow associated with the multiple access PDU session may be further based on the identified first data flow allocation percentage for the first access link associated with the second type of access and the identified second data flow allocation percentage for the second access link associated with the second type of access.

In some examples of the method, apparatuses, and non-transitory computer-readable medium described herein, the first data flow allocation percentage may be greater than or equal to the second data flow allocation percentage and the first data flow allocation percentage may be less than or equal to the second data flow allocation percentage.

Some examples of the method, apparatuses, and non-transitory computer-readable medium described herein may further include operations, features, means, or instructions for determining, based on the received control signaling, a first access link associated with the first type of access, and a second access link and a third access link associated with the second type of access, identifying, based on the configuration, a first data flow allocation percentage for the first access link associated with the first type of access, a second data flow allocation percentage for the second access link associated with the second type of access, and a third data flow allocation percentage for the third access link associated with the second type of access, and where allocating the data flow associated with the multiple access PDU session may be further based on the identified first data flow allocation percentage, the second identified data flow allocation percentage, and the identified third data flow allocation percentage.

In some examples of the method, apparatuses, and non-transitory computer-readable medium described herein, the first data flow allocation percentage may be greater than or equal to the second data flow allocation percentage or the third data flow allocation percentage, the first data flow allocation percentage may be less than or equal to the second data flow allocation percentage or the third data flow allocation percentage, the second data flow allocation percentage may be greater than or equal to the first data flow allocation percentage or the third data flow allocation percentage, the second data flow allocation percentage may be less than or equal to the first data flow allocation percentage or the third data flow allocation percentage, the third data flow allocation percentage may be greater than or equal to the first data flow allocation percentage or the second data flow allocation percentage, and the third data flow allocation percentage may be less than or equal to the first data flow allocation percentage or the second data flow allocation percentage.

Some examples of the method, apparatuses, and non-transitory computer-readable medium described herein may further include operations, features, means, or instructions for determining, based on the received control signaling, a first access link or a second access link, or both, associated with the first type of access, determining that the first access link or the second access link, or both, associated with the first type of access includes a high priority, and where allocating the data flow associated with the multiple access PDU session may be further based on the first access link or the second access link, or both, associated with the first type of access including the high priority.

Some examples of the method, apparatuses, and non-transitory computer-readable medium described herein may further include operations, features, means, or instructions for determining, based on the received control signaling, a first access link or a second access link, or both, associated with the second type of access, determining that the first access link or the second access link, or both, associated with the second type of access includes a high priority, and where allocating the data flow associated with the multiple access PDU session may be further based on the first access link or the second access link, or both, associated with the second type of access including the high priority.

In some examples of the method, apparatuses, and non-transitory computer-readable medium described herein, the configuration may be received from a session management function (SMF).

In some examples of the method, apparatuses, and non-transitory computer-readable medium described herein, the configuration includes a set of access traffic steering, switching, splitting (ATSSS) rules.

A method for wireless communication at a network entity is described. The method may include transmitting control signaling indicating a configuration for a multiple access PDU session associated with a set of multiple access links, the set of multiple access links associated with a first type of access, a second type of access, or a combination thereof and receiving allocated data flow over the set of multiple access links associated with the two types of access based on the transmitted control signaling.

An apparatus for wireless communication at a network entity is described. The apparatus may include a processor, memory coupled with the processor, and instructions stored in the memory. The instructions may be executable by the processor to cause the apparatus to transmit control signaling indicating a configuration for a multiple access PDU session associated with a set of multiple access links, the set of multiple access links associated with a first type of access, a second type of access, or a combination thereof and receive allocated data flow over the set of multiple access links associated with the two types of access based on the transmitted control signaling.

Another apparatus for wireless communication at a network entity is described. The apparatus may include means for transmitting control signaling indicating a configuration for a multiple access PDU session associated with a set of multiple access links, the set of multiple access links associated with a first type of access, a second type of access, or a combination thereof and means for receiving allocated data flow over the set of multiple access links associated with the two types of access based on the transmitted control signaling.

A non-transitory computer-readable medium storing code for wireless communication at a network entity is described. The code may include instructions executable by a processor to transmit control signaling indicating a configuration for a multiple access PDU session associated with a set of multiple access links, the set of multiple access links associated with a first type of access, a second type of access, or a combination thereof and receive allocated data flow over the set of multiple access links associated with the two types of access based on the transmitted control signaling.

In some examples of the method, apparatuses, and non-transitory computer-readable medium described herein, the configuration includes an information element indicating forwarding action information associated with the set of multiple access links.

Some examples of the method, apparatuses, and non-transitory computer-readable medium described herein may further include operations, features, means, or instructions for determining a first access link and a second access link of the set of multiple access links associated with the first type of access, determining first forwarding action information associated with the first access link and second forwarding action information associated with the second access link, and where transmitting the control signaling indicating the configuration for the multiple access PDU session may be further based on the first forwarding action information associated with the first access link and second forwarding action information associated with the second access link.

Some examples of the method, apparatuses, and non-transitory computer-readable medium described herein may further include operations, features, means, or instructions for determining a first access link and a second access link of the set of multiple access links associated with the second type of access, determining first forwarding action information associated with the first access link and second forwarding action information associated with the second access link, and where transmitting the control signaling indicating the configuration for the multiple access PDU session may be further based on the first forwarding action information associated with the first access link and second forwarding action information associated with the second access link.

Some examples of the method, apparatuses, and non-transitory computer-readable medium described herein may further include operations, features, means, or instructions for determining a first access link of the set of multiple access links associated with the first type of access and a second access link and a third access link of the set of multiple access links associated with the second type of access, determining first forwarding action information associated with the first access link, second forwarding action information associated with the second access link, and third forwarding action information associated with the third access link, and where transmitting the control signaling indicating the configuration for the multiple access PDU session may be further based on the first forwarding action information associated with the first access link, second forwarding action information associated with the second access link, and third forwarding action information associated with the third access link.

DETAILED DESCRIPTION

Figure 1:
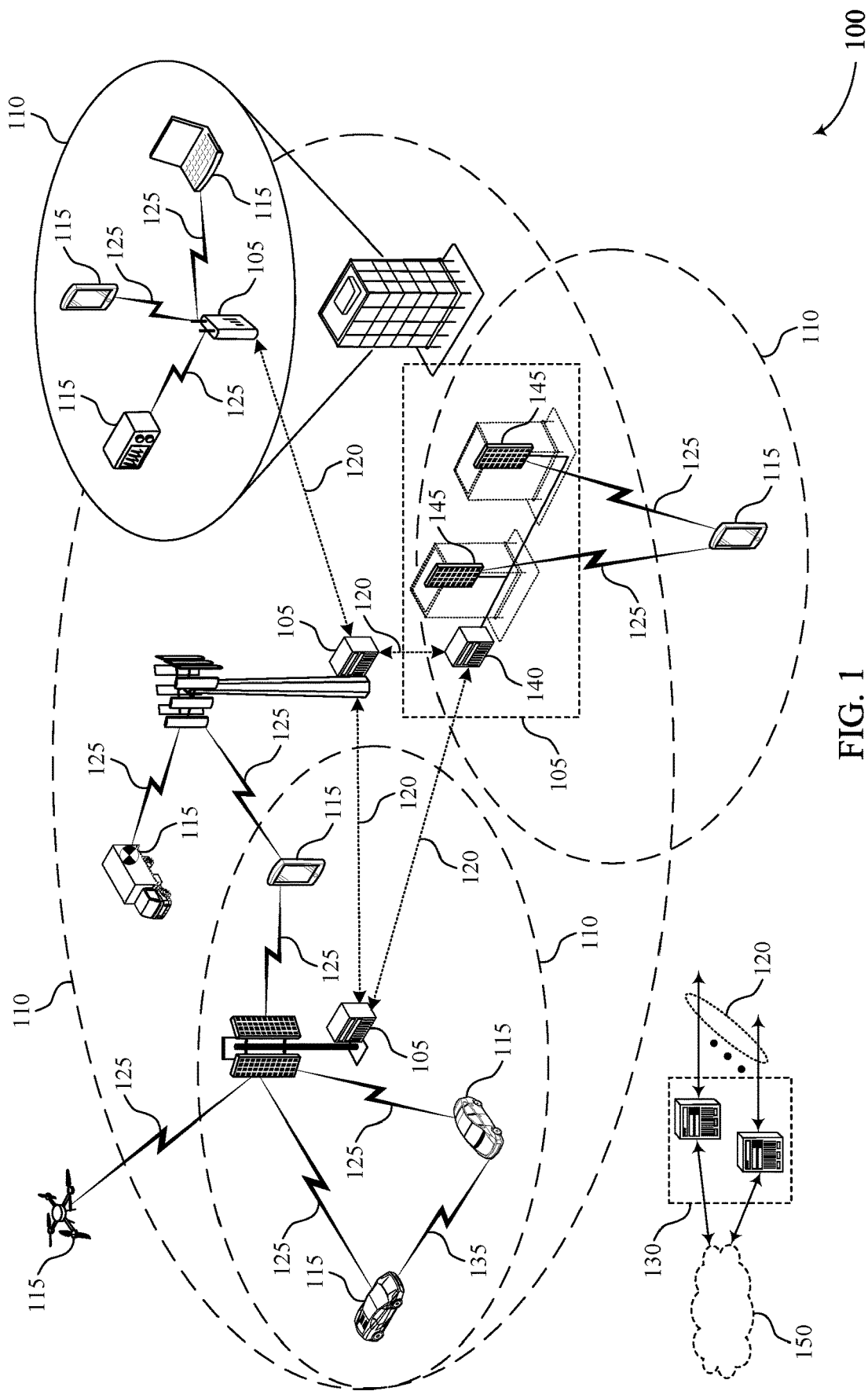
FIGS. 1 and 2 illustrate example of wireless communications systems that support techniques for managing access combinations for multiple access PDU sessions in accordance with various aspects of the present disclosure.

A wireless communications system may include communication devices that may support various access technologies (also referred to as a type of access). Examples of a type of access may include 3GPP access (e.g., LTE, LTE-A, LTE-A Pro, or NR), non-3GPP access (e.g., Wi-Fi, wireline), or a combination thereof. A communication device may support various access combinations for a session. For example, a communication device may use one type of access for wireless communication (e.g., receive data traffic, transmit data traffic, or a combination thereof), or two types of access simultaneously for the wireless communication. The communication device may support ATSSS functionalities to distribute the wireless communication (e.g., data traffic) over the two types of access for the session (e.g., a multiple access PDU session). However, in some cases, the communication device behavior might be undefined for managing the session when the communication is to distribute the wireless communication over some access combinations.

Various aspects of the present disclosure relate to enabling a communication device to support techniques for managing access combinations for multiple access sessions. For example, the communication device may receive control signaling indicating a configuration (e.g., including one or more ATSSS rules) for a multiple access PDU session associated with two or more access links. In some examples, the communication device may receive the configuration from the core network (e.g., a session management function (SMF) associated with the core network). The two or more access links may be associated with a first type of access, a second type of access, or a combination thereof. Based on the received control signaling, the communication device may be configured (e.g., according to the one or more ATSSS rules) to manage access combinations for multiple access sessions over two or more access links, which may have any combination of the above access types.

The communication device may select a steering mode (e.g., an ATSSS steering mode) for allocation of a data flow (e.g., data traffic) associated with the multiple access session to the two or more access links. Based on the selected steering mode, the communication device may allocate (e.g., distribute) the data flow associated with the multiple access session to the two or more access links. The communication device may then transmit the allocated data flow over the two or more access links associated with the two access type combinations. Additionally or alternatively, in the core network, some network entities, such as an SMF and user plane function (UPF) may exchange information (e.g., N4 rules) to manage access combinations for multiple access sessions over two or more access links, which may have any combination of the above access types. As a result, the communication device and core network may effectively and efficiently manage access combinations for multiple access sessions to increase energy saving at the communication device.

Aspects of the disclosure are initially described in the context of wireless communications systems. Aspects of the disclosure are further illustrated by and described with reference to apparatus diagrams, system diagrams, and flowcharts that relate to techniques for managing access combinations for multiple access sessions.

FIG. 1 illustrates an example of a wireless communications system 100 that supports techniques for managing access combinations for multiple access PDU sessions in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

One or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different.

Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A macro cell covers a relatively large geographic area (e.g., several kilometers in radius) and may allow unrestricted access by the UEs 115 with service subscriptions with the network provider supporting the macro cell. A small cell may be associated with a lower-powered base station

105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrow band IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network entities (e.g., also referred to as network equipment), such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network entities (e.g., radio heads and ANCs) or consolidated into a single network entity (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may support managing access combinations for multiple access sessions. For example, the UE 115 may receive control signaling indicating a configuration (e.g., including one or more ATSSS rules) for a multiple access session associated with two or more access links (e.g., two or more communication links 125). In some examples, the UE 115 may receive the configuration from the core network 130 (e.g., an SMF associated with the core network 130). The two or more access links may be associated with a first type of access, a second type of access, or a combination thereof.

The multiple access session may be a multiple access PDU session. A multiple access PDU session supported by two or more access technologies for wireless communication allows a data connection between a UE 115 and a data network by simultaneously using resource on two access technologies (e.g., user plane resources on two access networks). In some examples, a UE 115 may transmit a PDU session establishment request for any of the two or more access technologies if the UE 115 is registered to the same public land mobile network (PLMN). In some examples, if a UE 115 provides a multiple access PDU request then resources (e.g., user plane resources) may be established on the two or more access technologies. Alternatively, if a UE 115 requests to add resources (e.g., user plane resources) on one access technology of the multiple access PDU session, then the UE 115 may transmit a PDU session establishment request over the access including the PDU session identifier (ID) of the multiple access PDU session.

The UE 115 may be configured (e.g., according to the one or more ATSSS rules) to manage access combinations for multiple access sessions over two or more access links, which may have any combination of the above access types. The UE 115 may select a mode (e.g., an ATSSS mode) for allocation of a data flow associated with the multiple access session to the two or more access links. Based on the selected mode, the UE 115 may allocate (e.g., distribute) the data flow associated with the multiple access session to the two or more access links. The UE 115 may then transmit the allocated data flow over the two or more access links associated with the two access type combinations.

Additionally, in the wireless communications system 100, a network entity (e.g., network function, such as an SMF, a user policy function (UPF)). The network entity may transmit control signaling indicating a configuration for a multiple access PDU session associated with a plurality of access links. The plurality of access links associated with a first type of access, a second type of access, or a combination thereof. The configuration may include an indication of which Forward Access Information (FAI) Information Elements (IE) associated with the plurality of access links may (e.g., need to) be used. The network entity may receive allocated data flow over the plurality of access links associated with the two types of access based at least in part on the transmitted control signaling.

The wireless communications system 100 may support effective and efficient management of access combinations for multiple access sessions to increase energy saving at the UE 115. By implementing other access combinations related to multiple access sessions, the UE 115 may promote high reliability and low latency wireless communication. The UE 115 may also manage resource usage by implementing other access combinations related to multiple access sessions. Additionally or alternatively, by implementing other access combinations related to multiple access sessions, the UE 115 may experience reduced power consumption.

Figure 2:
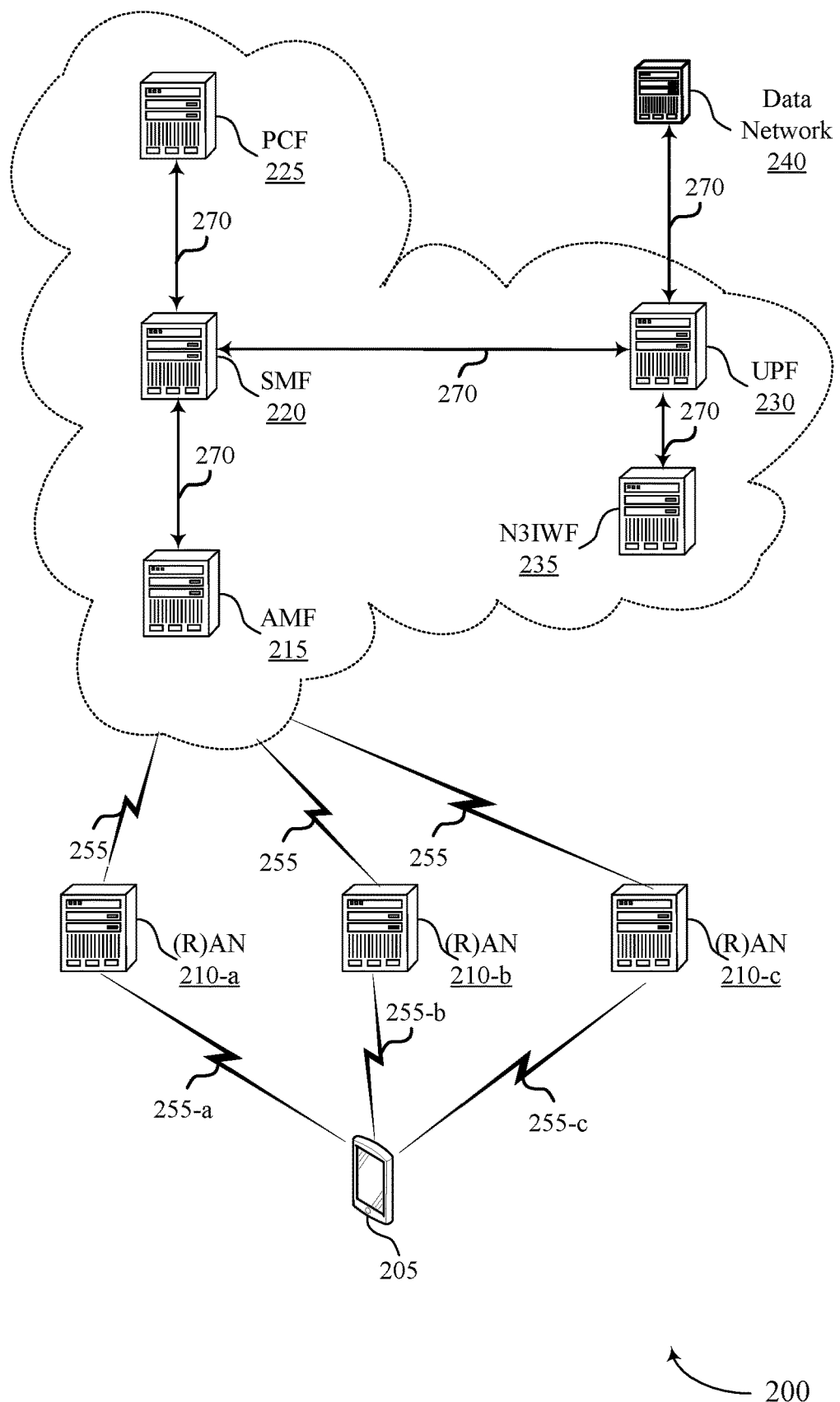

FIG. 2 illustrates an example of a wireless communications system 200 that supports techniques for managing access combinations for multiple access PDU sessions in accordance with various aspects of the present disclosure. In some examples, the wireless communications system 200 may support wireless access and wireline access. In some examples, wireline access may be referred to as wired access. Additionally or alternatively, wireline communication links may be referred to as wired communication links. The wireless communications system 200 may implement aspects of the wireless communications system 100 or may be implemented by aspects of the wireless communications systems 100 as described with reference to FIG. 1. For example, the wireless communications system 200 may include a UE 205, which may be examples of a UE as described with reference to FIG. 1. The wireless communications system 200 may also include one or more access networks, such as one or more (R)ANs 210 (e.g., a (R)AN 210-a, a (R)AN 210-b, or a (R)AN 210-c, or any combination thereof), an access and mobility management function (AMF) 215, an SMF 220, a policy control function (PCF) 225, a UPF 230, a non-3GPP Interworking Function (N3IWF) 235 (e.g., or a Trusted non-3GPP Access Gateway Function (TNGF), a data network 240, which may be examples of one or more corresponding devices or network entities as described with reference to FIG. 1.

A (R)AN 210 may be an example of an access network associated with 3GPP access (e.g., E-UTRAN or UTRAN) or an access network associated with non-3GPP access (e.g., Wi-Fi). For example, a (R)AN 210 may be an access network or an access network entity 140 as described with reference to FIG. 1. The AMF 215, the SMF 220, the PCF 225, or the UPF 230, or any combination thereof may be a network entity and part of a core network (e.g., a core network 130) as described with reference to FIG. 1. The UE 205 and the (R)AN 210-a, the (R)AN 210-b, or the (R)AN 210-c, or any combination thereof may be in communication over a communication link 255. One or more of the (R)ANs 210 may be in communication with the AMF 215, the SMF 220, or the UPF 230, or any combination thereof over a communication link 255. One or more of the AMF 215, the SMF 220, the PCF 225, or the UPF 230, or any combination thereof may be in communication with each other over a communication link 270.

The AMF 215 may perform various procedures based on policies, protocols, or received information. For example, the AMF 215 may support termination of non-access stratum (NAS) signaling, NAS ciphering and integrity protection, registration management, connection management, mobility management, access authentication and authorization, security context, among others. The SMF 220 may perform authentication and security functionality. The PCF 225 may support unified policy framework, providing policy rules to control plane functions, access subscription information for policy decisions. The UPF 230 may support proper data traffic routing in the wireless communications system 200. For example, the UPF 235 may support packet routing and forwarding, packet inspection, or data flow handling, or any combination thereof.

The SMF 220 may establish a session, such as a multiple access PDU session, with the data network 240. The multiple access PDU session may provide a multiple access PDU connectivity service, which may support communicating PDUs between the UE 205 and the data network 240 via, for example, multiple access communication links 255, 255-a, 255-b, 255-c. Although one data network 240 is shown, in some cases, the UE 205 may access multiple data networks concurrently and have multiple PDU sessions. As part of establishing the multiple access PDU session, the UE 205, the (R)AN 210 the AMF 215, the SMF 220, the PCF 225, or the UPF 230, or any combination thereof may perform a procedure to setup or release a signaling relation between the UE 205 and the data network 240. For example, the UE 205, the (R)AN 210 the AMF 215, the SMF 220, the PCF 225, or the UPF 230, or any combination thereof may perform a session establishment procedure, such as a multiple access PDU session establishment procedure.

As described herein, by way of example, some operations may be omitted from the PDU session establishment procedure, and other operations may be added to the PDU session establishment procedure. The UE 205 may transmit, and the AMF 215 may receive, a message, for example, a PDU session establishment request, which may indicate a multiple access PDU request or ATSSS capabilities, or a combination thereof. The AMF 215 may, based on the received PDU session establishment request, select the SMF 220. In some examples, the AMF 215 may select the SMF 220 based on ATSSS capabilities of the SMF 220. In some examples, the AMF 215 may transmit, and the SMF 220 may receive, a PDU session context request message, which may indicate the multiple access PDU request and over which access(es) the UE 205 is registered. In some examples, the SMF 220 may retrieve whether a multiple access PDU session is allowed or not. The SMF 220 may transmit, and the AMF 215 may receive, a PDU session context response.

In some examples, the SMF 220 may perform a PCF selection, for example, including selecting the PCF 225. The PCF 225 may determine, based on policy and subscription information if a multiple access PDU session is allowed. In some examples, the SMF 220 may derive ATSSS and N4 rules based on PCF rules. Additionally or alternatively, the SMF 220 may transmit, and the UPF 230 may receive an N4 session establishment (or modification) request including N4 information (e.g., N4 rules). The UPF 230 may transmit, and the SMF 220 may receive an N4 session establishment (or modification) response. Subsequently, one or more (R)ANs 210 may transmit, and the UE 205 may receive a PDU session establishment accept message, which may include the ATSSS rules.

In the example of FIG. 2, the UE 205 may support various types of access. Examples of types of access may include 3GPP access (e.g., LTE, LTE-A, LTE-A Pro, or NR), non-3GPP access (e.g., Wi-Fi), or a combination thereof. In some examples, the UE 205 may support various access combinations for a multiple access session. For example, the UE 205 may use one type of access for wireless communication (e.g., receive data traffic, transmit data traffic, or a combination thereof) associated with the multiple access session, or two types of access simultaneously for the wireless communication associated with the multiple access session. The UE 205 may support ATSSS functionalities to allocate the wireless communication (e.g., data traffic) over the two types of access associated with the multiple access session (e.g., a multiple access PDU session). The UE 205 may thereby manage a multiple access session, whose data traffic is communicated over two types of access (e.g., two access links of 3GPP type, two access links of non-3GPP type, one access link of 3GPP type plus two access links of non-3GPP type, or any combination thereof).

A (R)AN 210 may be associated with an access type. For example, the (R)AN 210-a, the (R)AN 210-b, or the (R)AN 210-c, or any combination thereof may be associated with a first access type, a second access type, or any combination thereof. For example, the (R)AN 210-a, the (R)AN 210-b, or the (R)AN 210-c, or any combination thereof, may be associated with a 3GPP access type or a non-3GPP access type. In the wireless communications system 200, the UE 205 may distribute the wireless communication (e.g., data traffic) over two types of access (e.g., two access links of 3GPP type, two access links of non-3GPP type, one access link of 3GPP type plus two access links of non-3GPP type, or any combination thereof) associated with the (R)AN 210-a, the (R)AN 210-b, or the (R)AN 210-c, or any combination thereof. For example, the UE 205 may allocate data traffic over two types of access (e.g., two access links of 3GPP type, two access links of non-3GPP type, one access link of 3GPP type plus two access links of non-3GPP type, or any combination thereof) according to one or more ATSSS modes, which may be referred to as ATSSS steering modes.

In some examples, the UE 205 may steer (e.g., distribute, allocate, route) data traffic, such as a service data flow (SDF), according to a first ATSSS mode (also referred to as an active-standby mode), using an active access (e.g., an active access link) according to an ATSSS mode (e.g., an active standby mode), if the active access is available. If the active access is not available and a standby access (e.g., a standby access link) is available, the UE 205 may steer (e.g., distribute, allocate, route) the data traffic using the standby access. In some other examples, the UE 205 may steer (e.g., distribute, allocate, route) data traffic, such as an SDF, according to a second ATSSS mode (also referred to as a smallest delay mode), by using an access with a smallest round-trip time (RTT). If there is one access available, the UE 205 may steer (e.g., distribute, allocate, route) the data traffic using the available access. In some cases, this steering mode is only applicable to nonguaranteed bit rate (GBR) SDF.

In other examples, the UE 205 may steer (e.g., distribute, allocate, route) data traffic, such as a SDF, according to a third ATSSS mode (also referred to as a load balancing mode), across two or more access technologies (e.g., both the 3GPP access and the non-3GPP access) with a given percentage if both accesses are available. If there is one access available, the UE 205 may steer (e.g., distribute, allocate, route) data traffic by using the available access. In some cases, this steering mode may be applicable to non-GBR SDF. In some other examples, the UE 205 may steer (e.g., distribute, allocate, route) data traffic, such as a SDF, according to a fourth ATSSS mode (also referred to as a load balancing mode), over the access with high priority unless the access with high priority is congested or unavailable, when the UE 205 steers the data traffic over both the access with high priority and the access with low priority. In some cases, this steering mode might be applicable to non-GBR SDF.

In the example of FIG. 2, the UE 205 may receive control signaling indicating a configuration for a multiple access session, such as a multiple access PDU session. The UE 205 may receive the control signaling indicating the configuration from the SMF 220. For example, the UE 205 may receive the configuration in a PDU establishment accept message. As such, the UE 205 may determine how to allocate (e.g., split, switch, route, aggregate) data traffic in an uplink direction among the different access types and access links. The configuration may include one or more ATSSS rules, which may be indicated in the configuration in the form of IEs.

Each ATSSS rule may be associated with one or more IE fields that may indicate information via one or more bits. Examples of IE fields may include an ATSSS rule ID, an ATSSS rule operation, a precedence value of ATSSS rule, a traffic descriptor field, an access selection descriptor field. The access selection descriptor field may be associated with one or more IE fields that may indicate information via one or more bits. For example, the access selection descriptor field may indicate a steering functionality, a steering mode, steering mode information, steering mode additional indicator threshold values. The UE 205 may determine how to steer (e.g., distribute, allocate, route) data traffic based in part on the configuration.

Additionally or alternatively, in the example of FIG. 2, the SMF the UPF 230, may exchange information, such as N4 information (also referred to as N4 rules) associated with a multiple access session, such as a multiple access PDU session. As such the UPF 230 may determine how to allocate (e.g., split, switch, route, aggregate) data traffic in a downlink direction among the different access types and access links. For example, the SMF 220 and the UPF 230 may exchange N4 information for steering (e.g., distributing, allocating, splitting, aggregating, routing) data traffic among the different access types and access links. The N4 information may be associated with one or more IE fields that may indicate information via one or more bits. Examples of IE fields may include a steering mode, FAI associated with different types of accesses (e.g., first 3GPP access link FAI, second 3GPP access link FAI, first non-3GPP access link FAI, second non-3GPP access link FAI), priority information associated with different types of accesses, among other information.

The UE 205 may be configured with one or more ATSSS rules that support managing access combinations for multiple access PDU sessions, such as two access links of 3GPP type, two access links of non-3GPP type, one access links of 3GPP type plus two access links of non-3GPP type, or any combination thereof. By extending the steering mode information associated with the one or more ATSSS rules and the related fields in the N4 rules, new combinations of accesses (e.g., two access links of 3GPP type, two access links of non-3GPP type, one access link of 3GPP type plus two access links of non-3GPP type, or any combination thereof) may be supported in the wireless communications system 200. For example, the UE 205 may receive control signaling indicating a configuration for a multiple access PDU session associated with a plurality of access links (e.g., communication links 255). The plurality of access links may be associated with a first type of access, a second type of access, or a combination thereof. The UE 205 may select a mode for allocation of a data flow associated with the multiple access PDU session to the plurality of access links based on the received control signaling. The UE 205 may allocate the data flow associated with the multiple access PDU session to the plurality of access links based on the selected mode, and transmit the allocated data flow over the plurality of access links associated with the first type of access, the second type of access, or a combination thereof.

According to one aspect, the UE 205 may steer (e.g., distribute, allocate, route) data traffic according to an active-standby mode and support some combinations of accesses (e.g., two access links of 3GPP type, two access links of non-3GPP type, one access link of 3GPP type plus two access links of non-3GPP type, or any combination thereof). For example, the UE 205 may determine a first access link (e.g., a communication link 255-*a*) and a second access link (e.g., a communication link 255-*b*) associated with the first type of access, such as a 3GPP access, and identify a status of each of the first access link and the second access link associated with the 3GPP access. The status may include an active status or a standby status. In some examples, the UE 205 may allocate a data flow associated with a multiple access PDU session based on the identified status of each of the first access link (e.g., the communication link 255-*a*) and the second access link (e.g., the communication link 255-*b*) associated with the 3GPP access.

In some examples, the first access link (e.g., the communication link 255-*a*) or the second access link (e.g., the communication link 255-*b*) associated with the 3GPP access may have an active status. That is, in some examples, the communication link 255-*a* may be a first active 3GPP access link and, in some other examples, the communication link 255-*b* may be a second active 3GPP access link. Additionally or alternatively there may be no standby access links. For example, the first access link (e.g., the communication link 255-*a*) associated with the 3GPP access may have an active status, while the second access link (e.g., the communication link 255-*b*) associated with the 3GPP access may have a standby status. Alternatively, the second access link (e.g., the communication link 255-*b*) associated with the 3GPP access may have an active status, while the first access link (e.g., the communication link 255-*a*) associated with the 3GPP access may have a standby status.

Additionally or alternatively, the UE 205 may determine a first access link (e.g., a communication link 255-a) and a second access link (e.g., a communication link 255-b) associated with the second type of access, such as a non-3GPP access, and identify a status of each of the first access link and the second access link associated with the non-3GPP access. The status may include an active status or a standby status. In some examples, the UE 205 may allocate a data flow associated with a multiple access PDU session based on the identified status of each of the first access link (e.g., the communication link 255-a) and the second access link (e.g., the communication link 255-b) associated with the non-3GPP access.

In some examples, the first access link (e.g., the communication link 255-a) or the second access link (e.g., the communication link 255-b) associated with the non-3GPP access may have the active status. That is, in some examples, the communication link 255-a may be a first active non-3GPP access link and, in some other examples, the communication link 255-b may be a second active non-3GPP access link. Additionally or alternatively, there may be no standby access links. For example, the first access link (e.g., the communication link 255-a) associated with the non-3GPP access may have an active status, while the second access link (e.g., the communication link 255-b) associated with the non-3GPP access may have a standby status. Alternatively, the second access link (e.g., the communication link 255-b) associated with the non-3GPP access may have an active status, while the first access link (e.g., the communication link 255-a) associated with the non-3GPP access may have a standby status.

Additionally or alternatively, the UE 205 may determine a first access link (e.g., a communication link 255-a) associated with the first type of access, such as a 3GPP access, and a second access link (e.g., a communication link 255-b) and a third access link (e.g., a communication link 255-c) associated with the second type of access, such as a non-3GPP access. The UE 205 may identify a status of each of the first access link (e.g., the communication link 255-a) associated with the 3GPP access and the second access link (e.g., the communication link 255-b) and the third access link (e.g., the communication link 255-c) associated with the non-3GPP access. The status may include an active status or a standby status. In some examples, the UE 205 may allocate a data flow associated with a multiple access PDU session based on the status of each the first access link, the second access link, and the third access link.

In some examples, the first access link (e.g., the communication link 255-a) associated with the 3GPP access may have the active status, and the second access link (e.g., the communication link 255-b) or the third access link (e.g., the communication link 255-c) associated with the non-3GPP access or both may have the standby status. In some examples, the second access link (e.g., the communication link 255-b) associated with the non-3GPP access may have the active status and there might be no standby access links. In some other examples, the third access link (e.g., the communication link 255-c) associated with the non-3GPP access may have the active status and there may be no standby access links.

In other examples, the second access link (e.g., the communication link 255-b) associated with the non-3GPP access may have the active status, and the first access link (e.g., the communication link 255-a) associated with 3GPP access or the third access link (e.g., the communication link 255-c) associated with non-3GPP access or both may have the standby status. Alternatively, the third access link (e.g., the communication link 255-c) associated with the non-3GPP access may have the active status, and the first access link (e.g., the communication link 255-a) associated with the 3GPP access or the second access link (e.g., the communication link 255-b) associated with non-3GPP access or both may have the standby status.

According to another aspect, the UE 205 may steer (e.g., distribute, allocate, route) data traffic according to a load balancing mode and support some combinations of accesses (e.g., at least two access links of 3GPP type, two access links of non-3GPP type, one access link of 3GPP type plus two access links of non-3GPP type, or any combination thereof). For example, the UE 205 may determine a first access link (e.g., the communication link 255-a) and a second access link (e.g., the communication link 255-b) associated with a first type of access, such as a 3GPP access. The UE 205 may identify a first data flow allocation percentage for the first access link (e.g., the communication link 255-a) associated with the 3GPP access and a second data flow allocation percentage for the second access link (e.g., the communication link 255-b) associated with the 3GPP access. In some examples, the UE 205 may allocate a data flow associated with a multiple access PDU session based on the identified first data flow allocation percentage for the first access link (e.g., the communication link 255-a) associated with the 3GPP access and the identified second data flow allocation percentage for the second access link (e.g., the communication link 255-b) associated with the 3GPP access.

The first data flow allocation percentage may be greater than or equal to the second data flow allocation percentage. The UE 205 may allocate a data flow associated with a multiple access PDU session 100% to the first access link (e.g., the communication link 255-a) associated with the 3GPP access and 0% to the second access link (e.g., the communication link 255-b) associated with the 3GPP access. In some examples, the UE 205 may allocate a data flow associated with a multiple access PDU session 90% to the first access link (e.g., the communication link 255-a) associated with the 3GPP access and 10% to the second access link (e.g., the communication link 255-b) associated with the 3GPP access. In some other examples, the UE 205 may allocate a data flow associated with a multiple access PDU session 80% to the first access link (e.g., the communication link 255-a) associated with the 3GPP access and 20% to the second access link (e.g., the communication link 255-b) associated with the 3GPP access.

In some other examples, the UE 205 may allocate a data flow associated with a multiple access PDU session 70% to the first access link (e.g., the communication link 255-a) associated with the 3GPP access and 30% to the second access link (e.g., the communication link 255-b) associated with the 3GPP access. In other examples, the UE 205 may allocate a data flow associated with a multiple access PDU session 60% to the first access link (e.g., the communication link 255-a) associated with the 3GPP access and 40% to the second access link (e.g., the communication link 255-b) associated with the 3GPP access. Alternatively, the first data flow allocation percentage may be equal to the second data flow allocation percentage. For example, the UE 205 may allocate a data flow associated with a multiple access PDU session 50% to the first access link (e.g., the communication link 255-a) associated with the 3GPP access and 50% to the second access link (e.g., the communication link 255-b) associated with the 3GPP access.

Alternatively, the first data flow allocation percentage may be less than or equal to the second data flow allocation percentage. In some examples, the UE 205 may allocate a data flow associated with a multiple access PDU session 40% to the first access link (e.g., the communication link 255-a) associated with the 3GPP access and 60% to the second access link (e.g., the communication link 255-b) associated with the 3GPP access. In some other examples, the UE 205 may allocate a data flow associated with a multiple access PDU session 30% to the first access link (e.g., the communication link 255-a) associated with the 3GPP access and 70% to the second access link (e.g., the communication link 255-b) associated with the 3GPP access. In some other examples, the UE 205 may allocate a data flow associated with a multiple access PDU session 20% to the first access link (e.g., the communication link 255-a) associated with the 3GPP access and 80% to the second access link (e.g., the communication link 255-b) associated with the 3GPP access. In other examples, the UE 205 may allocate a data flow associated with a multiple access PDU session 10% to the first access link (e.g., the communication link 255-a) associated with the 3GPP access and 90% to the second access link (e.g., the communication link 255-b) associated with the 3GPP access. In some examples, the UE 205 may allocate a data flow associated with a multiple access PDU session 0% to the first access link (e.g., the communication link 255-a) associated with the 3GPP access and 100% to the second access link (e.g., the communication link 255-b) associated with the 3GPP access.

In some other examples, the UE 205 may determine that a first access link (e.g., the communication link 255-a) and a second access link (e.g., the communication link 255-b) are associated with a second type of access, such as a non-3GPP access. The UE 205 may identify a first data flow allocation percentage for the first access link (e.g., the communication link 255-a) associated with the non-3GPP access and a second data flow allocation percentage for the second access link (e.g., the communication link 255-b) associated with the non-3GPP access. The UE 205 may allocate a data flow associated with a multiple access PDU session based on the identified first data flow allocation percentage for the first access link (e.g., the communication link 255-a) associated with the non-3GPP access and the identified second data flow allocation percentage for the second access link (e.g., the communication link 255-b) associated with the non-3GPP access.

In some examples, the first data flow allocation percentage may be greater than or equal to the second data flow allocation percentage. The UE 205 may allocate a data flow associated with a multiple access PDU session 100% to the first access link (e.g., the communication link 255-a) associated with the non-3GPP access and 0% to the second access link (e.g., the communication link 255-b) associated with the non-3GPP access. In some examples, the UE 205 may allocate a data flow associated with a multiple access PDU session 90% to the first access link (e.g., the communication link 255-a) associated with the non-3GPP access and 10% to the second access link (e.g., the communication link 255-b) associated with the non-3GPP access. In some other examples, the UE 205 may allocate a data flow associated with a multiple access PDU session 80% to the first access link (e.g., the communication link 255-a) associated with the non-3GPP access and 20% to the second access link (e.g., the communication link 255-b) associated with the non-3GPP access.

In some other examples, the UE 205 may allocate a data flow associated with a multiple access PDU session 70% to the first access link (e.g., the communication link 255-a) associated with the non-3GPP access and 30% to the second access link (e.g., the communication link 255-b) associated with the non-3GPP access. In other examples, the UE 205 may allocate a data flow associated with a multiple access PDU session 60% to the first access link (e.g., the communication link 255-a) associated with the non-3GPP access and 40% to the second access link (e.g., the communication link 255-b) associated with the non-3GPP access. Alternatively, the first data flow allocation percentage may be equal to the second data flow allocation percentage. For example, the UE 205 may allocate a data flow associated with a multiple access PDU session 50% to the first access link (e.g., the communication link 255-a) associated with the non-3GPP access and 50% to the second access link (e.g., the communication link 255-b) associated with the non-3GPP access.

Alternatively, the first data flow allocation percentage may be less than or equal to the second data flow allocation percentage. In some examples, the UE 205 may allocate a data flow associated with a multiple access PDU session 40% to the first access link (e.g., the communication link 255-a) associated with the non-3GPP access and 60% to the second access link (e.g., the communication link 255-b) associated with the non-3GPP access. In some other examples, the UE 205 may allocate a data flow associated with a multiple access PDU session 30% to the first access link (e.g., the communication link 255-a) associated with the non-3GPP access and 70% to the second access link (e.g., the communication link 255-b) associated with the non-3GPP access. In some other examples, the UE 205 may allocate a data flow associated with a multiple access PDU session 20% to the first access link (e.g., the communication link 255-a) associated with the non-3GPP access and 80% to the second access link (e.g., the communication link 255-b) associated with the non-3GPP access. In other examples, the UE 205 may allocate a data flow associated with a multiple access PDU session 10% to the first access link (e.g., the communication link 255-a) associated with the non-3GPP access and 90% to the second access link (e.g., the communication link 255-b) associated with the non-3GPP access. In some examples, the UE 205 may allocate a data flow associated with a multiple access PDU session 0% to the first access link (e.g., the communication link 255-a) associated with the non-3GPP access and 100% to the second access link (e.g., the communication link 255-b) associated with the non-3GPP access.

In other examples, the UE 205 may determine that a first access link (e.g., the communication link 255-a) is associated with a first type of access, such as a 3GPP access, while a second access link (e.g., the communication link 255-b) and a third access link (e.g., the communication link 255-c) are associated with a second type of access, such as a non-3GPP access. The UE 205 may identify a first data flow allocation percentage for the first access link (e.g., the communication link 255-a) associated with the 3GPP access, a second data flow allocation percentage for the second access link (e.g., the communication link 255-b) associated with the non-3GPP access, and a third data flow allocation percentage for the third access link (e.g., the communication link 255-c) associated with the non-3GPP access. The UE 205 may allocate a data flow associated with a multiple access PDU session based on the identified first data flow allocation percentage for the first access link (e.g., the communication link 255-a) associated with the 3GPP access, the identified second data flow allocation percentage for the second access link (e.g., the communication link 255-b) associated with the non-3GPP access, and the identified third data flow allocation percentage for the third access link (e.g., the communication link 255-c) associated with the non-3GPP access.

In some examples, the first data flow allocation percentage is greater than or equal to the second data flow allocation percentage or the third data flow allocation percentage. For example, the UE 205 may allocate a data flow associated with a multiple access PDU session 100% to the first access link (e.g., the communication link 255-a) associated with the 3GPP access and 0% to the second access link (e.g., the communication link 255-b) associated with the non-3GPP access and 0% to the third access link (e.g., the communication link 255-c) associated with the non-3GPP access. Alternatively, the first data flow allocation percentage is less than or equal to the second data flow allocation percentage or the third data flow allocation percentage. For example, the UE 205 may allocate a data flow associated with a multiple access PDU session 10% to the first access link (e.g., the communication link 255-a) associated with the 3GPP access and 10% to the second access link (e.g., the communication link 255-b) associated with the non-3GPP access and 80% to the third access link (e.g., the communication link 255-c) associated with the non-3GPP access.

In some other examples, the second data flow allocation percentage is greater than or equal to the first data flow allocation percentage or the third data flow allocation percentage. For example, the UE 205 may allocate a data flow associated with a multiple access PDU session 80% to the second access link (e.g., the communication link 255-b) associated with the non-3GPP access and 10% to the first access link (e.g., the communication link 255-a) associated with the 3GPP access and 10% to the third access link (e.g., the communication link 255-c) associated with the non-3GPP access. Alternatively, the second data flow allocation percentage is less than or equal to the first data flow allocation percentage or the third data flow allocation percentage. For example, the UE 205 may allocate a data flow associated with a multiple access PDU session 20% to the second access link (e.g., the communication link 255-b) associated with the non-3GPP access and 40% to the first access link (e.g., the communication link 255-a) associated with the 3GPP access and 40% to the third access link (e.g., the communication link 255-c) associated with the non-3GPP access.

In other examples, the third data flow allocation percentage is greater than or equal to the first data flow allocation percentage or the second data flow allocation percentage. For example, the UE 205 may allocate a data flow associated with a multiple access PDU session 70% to the third access link (e.g., the communication link 255-c) associated with the non-3GPP access and 10% to the first access link (e.g., the communication link 255-a) associated with the 3GPP access and 20% to the second access link (e.g., the communication link 255-b) associated with the non-3GPP access. Alternatively, the third data flow allocation percentage is less than or equal to the first data flow allocation percentage or the second data flow allocation percentage. For example, the UE 205 may allocate a data flow associated with a multiple access PDU session 30% to the third access link (e.g., the communication link 255-c) associated with the non-3GPP access and 40% to the first access link (e.g., the communication link 255-a) associated with the 3GPP access and 30% to the second access link (e.g., the communication link 255-b) associated with the non-3GPP access.

According to yet another aspect, the UE 205 may steer (e.g., distribute, allocate, route) data traffic according to a priority-based mode and support some combinations of accesses (e.g., at least two access links of 3GPP type, two access links of non-3GPP type, one access link of 3GPP type plus two access links of non-3GPP type, or any combination thereof). For example, the UE 205 may determine a first access link (e.g., the communication link 255-a) and a second access link (e.g., the communication link 255-b) associated with a first type of access, such as a 3GPP access. The UE 205 may determine that the first access link (e.g., the communication link 255-a) associated with the 3GPP access has a high priority. Alternatively, the UE 205 may determine that the second access link (e.g., the communication link 255-b) associated with the 3GPP access has a high priority. Additionally or alternatively, the UE 205 may determine a first access link (e.g., the communication link 255-a) and a second access link (e.g., the communication link 255-b) associated with a second type of access, such as a non-3GPP access. The UE 205 may determine that the first access link (e.g., the communication link 255-a) associated with the non-3GPP access has a high priority. Alternatively, the UE 205 may determine that the second access link (e.g., the communication link 255-b) associated with the non-3GPP access has a high priority. In some examples, the UE 205 may allocate a data flow associated with a multiple access PDU session based on the high priority of the first access link (e.g., the communication link 255-a) associated with the 3GPP access (or the non-3GPP access) or the high priority of the second access link (e.g., the communication link 255-b) associated with the 3GPP access (or the non-3GPP access).

In the example of FIG. 2, the SMF 220 may transmit, and the UPF 230 may receive, control signaling indicating a configuration (e.g., N4 information) for a multiple access session (e.g., a multiple access PDU session). The configuration may include an indication of which FAI IEs associated with the plurality of access links need to be used, for example, the communication link 255-a, the communication link 255-b, or the communication link 255-c, or a combination thereof. In some examples, an IE may be an access FAI indication, which may identify which FAI IEs to use for steering (e.g., distributing, allocating, routing) data traffic. In some examples, the access FAI indication may be a FAI IE indication, which may indicate to use the first 3GPP access link FAI or the second 3GPP access link FAI, or the first non-3GPP access link FAI, or the second non-3GPP access link FAI, or a combination thereof.

The UPF 230 may steer (e.g., distribute, allocate, route) data traffic based on the 3GPP access FAI or non-3GPP access FAI, or both. In some other examples, the access FAI IEs indication may indicate to use 3GPP access FAI associated with a first access link (e.g., the communication link 255-a) and 3GPP access FAI associated with a second access link (e.g., the communication link 255-b). In other examples, the access FAI indication may indicate to use non-3GPP access FAI associated with a first access link (e.g., the communication link 255-a) and non-3GPP access FAI associated with a second access link (e.g., the communication link 255-b). In some other examples, the access FAI indication may indicate to use 3GPP access FAI associated with a first access link (e.g., the communication link 255-a), first non-3GPP access FAI associated with a second access link (e.g., the communication link 255-b), and second non-3GPP access FAI associated with a third access link (e.g., the communication link 255-c). The UPF 230 may thereby steer (e.g., distribute, allocate, route) data traffic based on the access FAI indication and the supported combinations of access types.

The FAI may provision 3GPP access link specific FAI if the UE 205 is registered for 3GPP access, except when a steering mode value in the configuration is set to an active-standby mode, one of the non-3GPP access links or a first 3GPP access link is the active access and a second 3GPP access link is not used as standby access. In some examples, the FAI may provision non-3GPP access link specific FAI if the UE 205 is registered for non-3GPP access, except when a steering mode value in the configuration is set to an active-standby mode, one of the 3GPP access links or a first non-3GPP access link is the active access and a second non-3GPP access link is not used as standby access.

The wireless communications system 200 support techniques for managing access combinations for multiple access sessions by enabling new encoding possibilities for the steering mode information to enable usage of steering modes with new combinations of access links. By implementing other access combinations related to multiple access sessions, the UE 205 may promote high reliability and low latency wireless communication. The UE 205 may also manage resource usage by implementing other access combinations related to multiple access sessions.

Additionally or alternatively, by implementing other access combinations related to multiple access sessions, the UE 205 may experience reduced power consumption.

Figure 3:
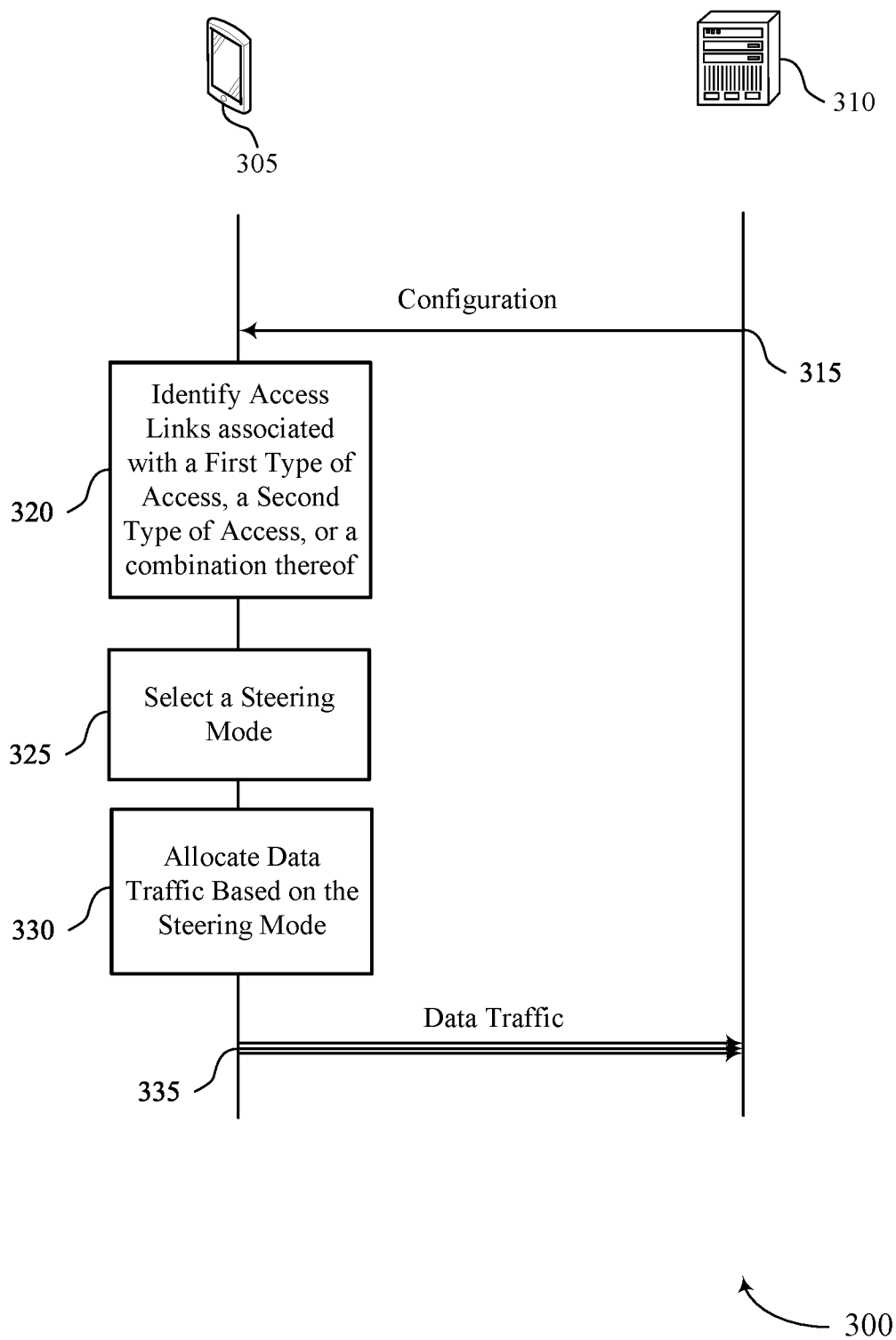
FIG. 3 illustrates an example of a process flow that supports techniques for managing access combinations for multiple access PDU sessions in accordance with various aspects of the present disclosure.

FIG. 3 illustrates an example of a process flow 300 that supports techniques for managing access combinations for multiple access PDU sessions in accordance with various aspects of the present disclosure. In some examples, the process flow 300 may implement or be implemented by aspects of the wireless communications system 200. For example, the process flow 300 may include a UE 305 and a core network 310, which may be examples of the corresponding devices or network entities described herein. For example, the core network 310 may include an AMF, an SMF, a PCF, or a UPF, or any combination thereof, or other network equipment as described with reference to FIG. 2. In the following description of the process flow 300, the operations between the UE 305 and the core network 310 may be transmitted in a different order than the example order shown, or the operations performed by the UE 305 and the core network 310 may be performed in different orders or at different times, or the operations performed by a device may additionally or alternatively be performed by another device. Some operations may also be omitted from the process flow 300, and other operations may be added to the process flow 300.

At 315, the core network 310 (e.g., an SMF) may transmit, and the UE 305 may receive, a configuration (e.g., ATSSS rules) for a multiple access PDU session associated with a set of access links. At 320, the UE 305 may identify access links associated with a first type of access (e.g., 3GPP access), a second type of access (e.g., non-3GPP access), or a combination thereof. At 325, the UE 305 may select a steering mode (e.g., based on the configuration) for allocation of data traffic associated with the multiple access PDU session to the set of access links. At 330, the UE 305 may allocate the data traffic associated with the multiple access PDU session to the set of access links as described with reference to FIG. 2. At 335, the UE 305 may transmit the allocated data traffic as described with reference to FIG. 2.

Figure 4:
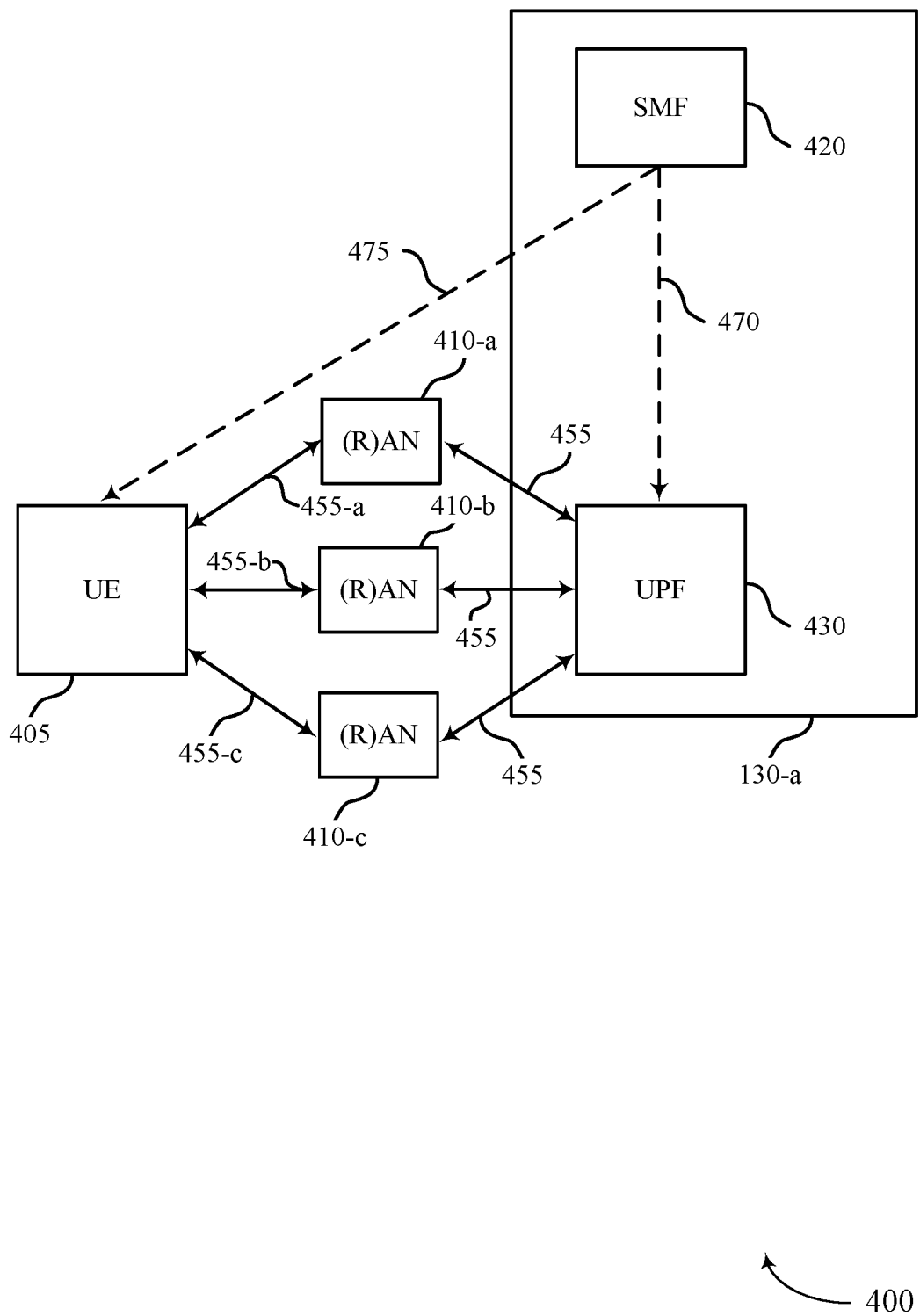
FIG. 4 shows a diagram of a system including a device that supports techniques for managing access combinations for multiple access PDU sessions in accordance with various aspects of the present disclosure.

FIG. 4 shows a diagram of a system 400 including a core network 130-*a* that supports techniques for managing access combinations for multiple access PDU sessions in accordance with various aspects of the present disclosure. In some examples, the system 400 may support wireline and wireless communications. For example, the system 400 may implement or be implemented by aspects of the wireless communications system 100 or the wireless communications systems 200 as described with reference to FIGS. 1 and 2. The wireless communications system 200 may include a UE 405, which may be examples of a UE as described with reference to FIGS. 1 and 2. The system 400 may also include one or more access networks, such as one or more (R)ANs 410 (e.g., a (R)AN 410-*a*, a (R)AN 410-*b*, or a (R)AN 410-*c*, or any combination thereof), an SMF 420, and a UPF 430, which may be examples of one or more corresponding devices, network entities, or network equipment as described with reference to FIGS. 1 and 2.

A (R)ANs 410 may be examples of a base station 105 (e.g., a radio access network) or an access network entity 140 as described with reference to FIG. 1. The SMF 420, and the UPF 430 may be network equipment and part of a core network (e.g., the core network 130-*a*) as described with reference to FIG. 1. During a multiple access PDU session, for example with three access links (e.g., also referred to as communication links or legs) the UPF 430 may be in communication with multiple (R)ANs 410 (e.g., the (R)AN 410-*a*, the (R)AN 410-*b*, or the (R)AN 410-*c*) via a communication link 455 (e.g., bi-directional communication links) and the UE 405 may be in communication with each of the multiple (R)ANs 410 (e.g., the (R)AN 410-*a*, the (R)AN 410-*b*, and the (R)AN 410-*c*) via a respective communication link. For example, the UE 405 may be in communication with the (R)AN 410-*a* via the communication link 455-*a* (e.g., a first access link), the (R)AN 410-*b* via the communication link 455-*b* (e.g., a second access link), and the (R)AN 410-*c* via the communication link 455-*c* (e.g., a third access link). In some examples, a (R)AN 410 (e.g., the (R)AN 410-*a*, the (R)AN 410-*b*, or the (R)AN 410-*c*) may be unaware that the multiple access PDU session has three legs (e.g., may be unaware that the UE 405 is in communication with other (R)ANs 410).

In some examples, the multiple access PDU session may be established by the SMF 420 based on the trigger by the UE 405. For example, the SMF may send ATSSS rules to the UE 405 via a communication link 475 (e.g., through an AMF, not shown). The UE 405 may apply the received ATSSS rules for the uplink traffic of the multiple access PDU session. The SMF may send N4 rules to the UPF 430 via a communication link 470 (e.g., a wireline communication link). The UPF 430 may apply the received N4 rules for the downlink traffic in the multiple access PDU session. The first access link, the second access link, and the third access link may be of a first type of access (e.g., 3GPP access), a second type of access (e.g., non-3GPP access), or a combination thereof. For example, the SMF 420 may indicate, to the UE 405 and UPF 430, how to split, steer, and switch traffic among access types and among access links (e.g., in case of multiple links for the same access type).

Figure 5:
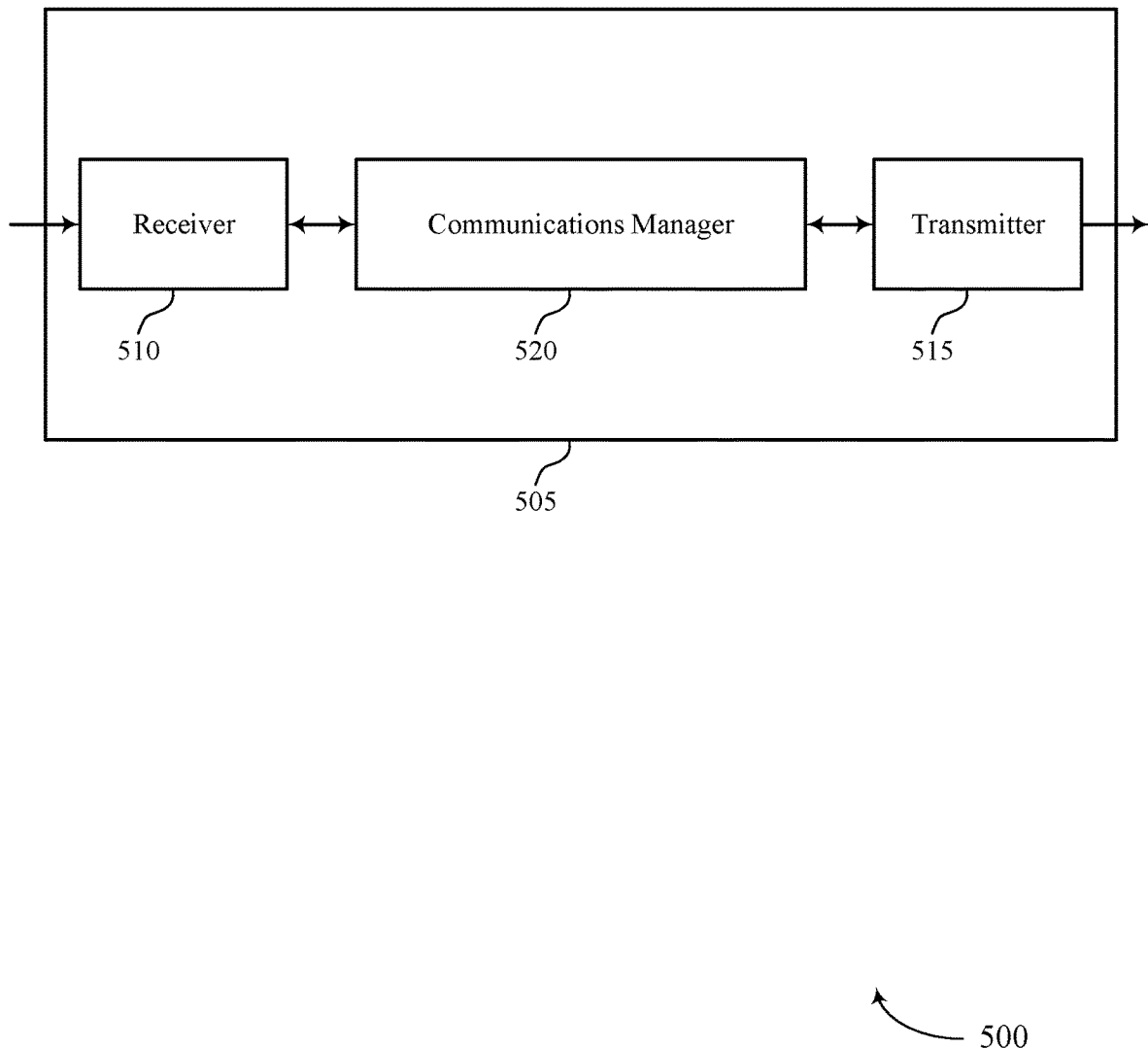
FIGS. 5 and 6 show block diagrams of devices that support techniques for managing access combinations for multiple access PDU sessions in accordance with various aspects of the present disclosure.

FIG. 5 shows a block diagram 500 of a device 505 that supports techniques for managing access combinations for multiple access PDU sessions in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing access combinations for multiple access PDU sessions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for managing access combinations for multiple access PDU sessions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for managing access combinations for multiple access PDU sessions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a device 505 in accordance with examples as disclosed herein. For example, the communications manager 520 may be configured as or otherwise support a means for receiving control signaling indicating a configuration for a multiple access PDU session associated with a set of multiple access links, the set of multiple access links associated with a first type of access, a second type of access, or a combination thereof. The communications manager 520 may be configured as or otherwise support a means for selecting a mode for allocation of a data flow associated with the multiple access PDU session to the set of multiple access links based on the received control signaling. The communications manager 520 may be configured as or otherwise support a means for allocating the data flow associated with the multiple access PDU session to the set of multiple access links based on the selected mode. The communications manager 520 may be configured as or otherwise support a means for transmitting the allocated data flow over the set of multiple access links associated with the two types of access.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
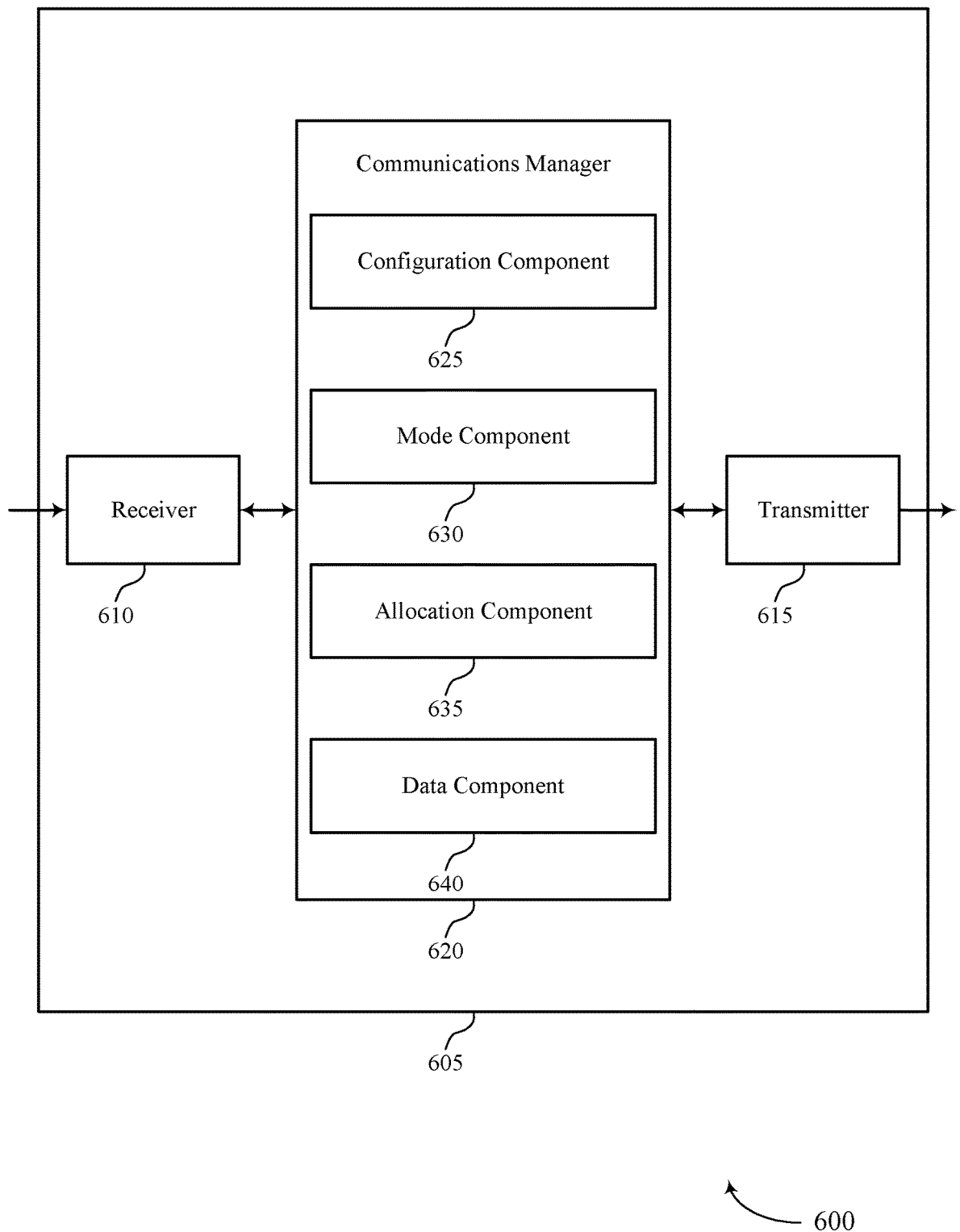

FIG. 6 shows a block diagram 600 of a device 605 that supports techniques for managing access combinations for multiple access PDU sessions in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing access combinations for multiple access PDU sessions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing access combinations for multiple access PDU sessions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for managing access combinations for multiple access PDU sessions as described herein. For example, the communications manager 620 may include a configuration component 625, a mode component 630, an allocation component 635, a data component 640, or any combination thereof. The communications manager 620 may be an example of aspects of a communications manager 620 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a device 605 in accordance with examples as disclosed herein. The configuration component 625 may be configured as or otherwise support a means for receiving control signaling indicating a configuration for a multiple access PDU session associated with a set of multiple access links, the set of multiple access links associated with a first type of access, a second type of access, or a combination thereof. The mode component 630 may be configured as or otherwise support a means for selecting a mode for allocation of a data flow associated with the multiple access PDU session to the set of multiple access links based on the received control signaling. The allocation component 635 may be configured as or otherwise support a means for allocating the data flow associated with the multiple access PDU session to the set of multiple access links based on the selected mode. The data component 640 may be configured as or otherwise support a means for transmitting the allocated data flow over the set of multiple access links associated with the two types of access.

Figure 7:
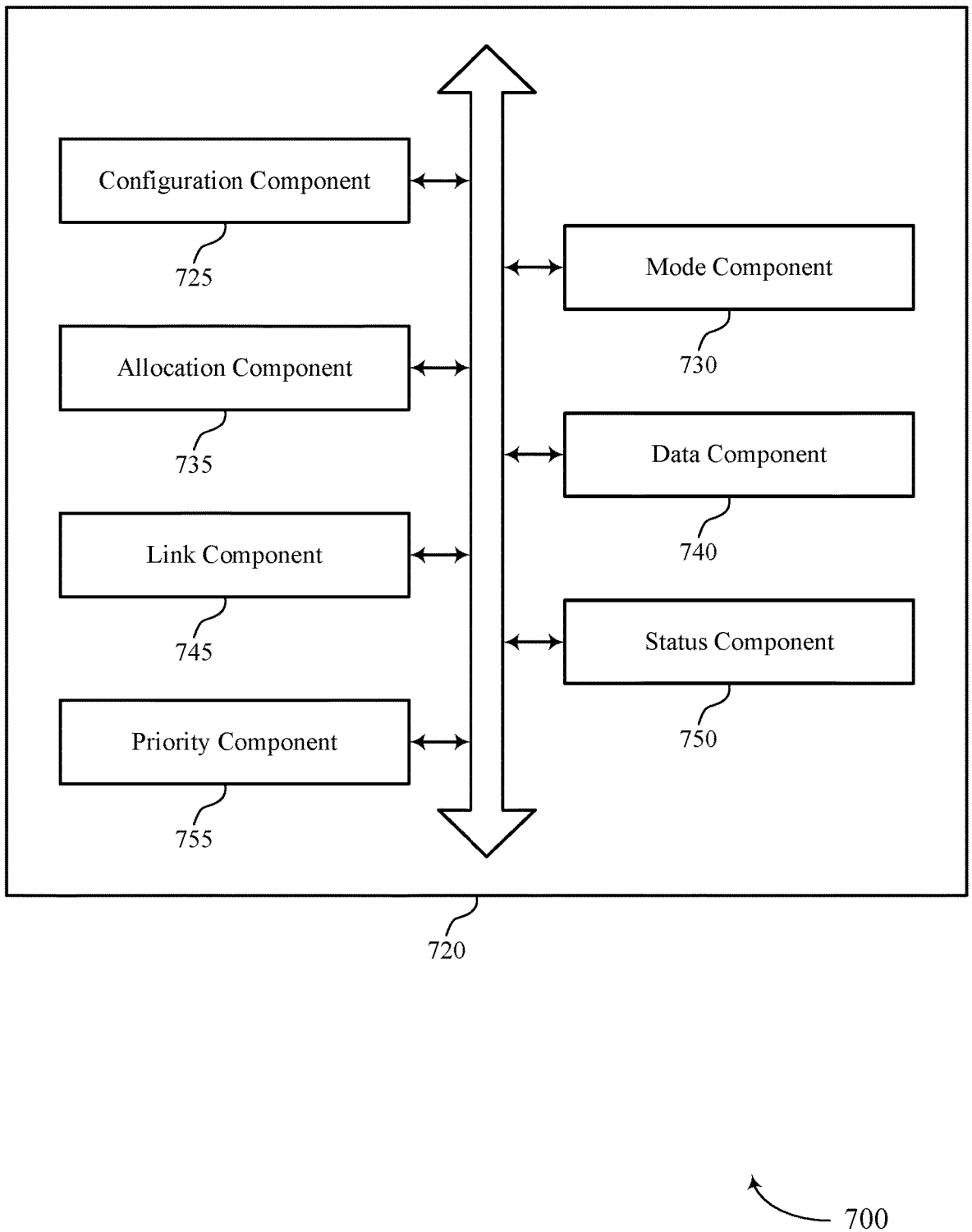
FIG. 7 shows a block diagram of a communications manager that supports techniques for managing access combinations for multiple access PDU sessions in accordance with various aspects of the present disclosure.

FIG. 7 shows a block diagram 700 of a communications manager 720 that supports techniques for managing access combinations for multiple access PDU sessions in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for managing access combinations for multiple access PDU sessions as described herein. For example, the communications manager 720 may include a configuration component 725, a mode component 730, an allocation component 735, a data component 740, a link component 745, a status component 750, a priority component 755, or any combination thereof. Each of these components may communicate, directly or indirectly, with one another (e.g., via one or more buses).

The communications manager 720 may support wireless communication at a device in accordance with examples as disclosed herein. The configuration component 725 may be configured as or otherwise support a means for receiving control signaling indicating a configuration for a multiple access PDU session associated with a set of multiple access links, the set of multiple access links associated with a first type of access, a second type of access, or a combination thereof. The mode component 730 may be configured as or otherwise support a means for selecting a mode for allocation of a data flow associated with the multiple access PDU session to the set of multiple access links based on the received control signaling. The allocation component 735 may be configured as or otherwise support a means for allocating the data flow associated with the multiple access PDU session to the set of multiple access links based on the selected mode. The data component 740 may be configured as or otherwise support a means for transmitting the allocated data flow over the set of multiple access links associated with the two types of access.

In some examples, the link component 745 may be configured as or otherwise support a means for determining a first access link and a second access link of the set of multiple access links associated with the first type of access based on the received control signaling. In some examples, the status component 750 may be configured as or otherwise support a means for identifying a status of each of the first access link and the second access link associated with the first type of access, where the status includes an active status or a standby status. In some examples, the allocation component 735 may be configured as or otherwise support a means for allocating the data flow associated with the multiple access PDU session based on the identified status of each of the first access link and the second access link associated with the first type of access.

In some examples, the first access link or the second access link associated with the first type of access includes the active status, and the link component 745 may be configured as or otherwise support a means for determining a lack of a respective access link of the set of multiple access links including the standby status. In some examples, the first access link associated with the first type of access includes the active status, and where the second access link associated with the first type of access includes the standby status. In some examples, the second access link associated with the first type of access includes the active status, and where the first access link associated with the first type of access includes the standby status.

In some examples, the link component 745 may be configured as or otherwise support a means for determining a first access link and a second access link of the set of multiple access links associated with the second type of access based on the received control signaling. In some examples, the status component 750 may be configured as or otherwise support a means for identifying a status of each of the first access link and the second access link associated with the second type of access, where the status includes an active status or a standby status. In some examples, the allocation component 735 may be configured as or otherwise support a means for allocating the data flow associated with the multiple access PDU session based on the identified status of each of the first access link and the second access link associated with the second type of access. Additionally or alternatively, the allocation component 735 may be configured as or otherwise support a means for allocating a percentage of the data flow associated with the multiple access PDU session based on the identified status of each of the first access link and the second access link associated with the second type of access.

In some examples, the first access link or the second access link associated with the second type of access includes the active status, and the link component 745 may be configured as or otherwise support a means for determining a lack of a respective access link of the set of multiple access links including the standby status. In some examples, the first access link associated with the second type of access includes the active status, and where the second access link associated with the second type of access includes the standby status. In some examples, the first access link associated with the second type of access includes the active status, and where the second access link associated with the second type of access includes the standby status.

In some examples, the link component 745 may be configured as or otherwise support a means for determining, based on the received control signaling, a first access link associated with the first type of access, and a second access link and a third access link associated with the second type of access. In some examples, the status component 750 may be configured as or otherwise support a means for identifying a status of each of the first access link associated with the first type of access and the second access link and the third access link associated with the second type of access, where the status includes an active status or a standby status. In some examples, the allocation component 735 may be configured as or otherwise support a means for allocating the data flow associated with the multiple access PDU session based on the status of each the first access link, the second access link, and the third access link. In some examples, the first access link associated with the first type of access includes the active status. In some examples, the second access link or the third access link associated with the second type of access, or both, include the standby status.

In some examples, the second access link associated with the second type of access includes the active status, and the link component 745 may be configured as or otherwise support a means for determining a lack of a respective access link of the set of multiple access links including the standby status. In some examples, the second access link associated with the second type of access includes the active status. In some examples, the first access link associated with the first type of access or the third access link associated with the second type of access, or both include the standby status. In some examples, the third access link associated with the second type of access includes the active status, and the link component 745 may be configured as or otherwise support a means for determining a lack of a respective access link of the set of multiple access links including the standby status. In some examples, the third access link associated with the second type of access includes the active status. In some examples, the first access link associated with the first type of access or the second access link associated with the second type of access, or both, includes the standby status.

In some examples, the link component 745 may be configured as or otherwise support a means for determining a first access link and a second access link of the set of multiple access links associated with the first type of access based on the received control signaling. In some examples, the allocation component 735 may be configured as or otherwise support a means for identifying, based on the configuration, a first data flow allocation percentage for the first access link associated with the first type of access and a second data flow allocation percentage for the second access link associated with the first type of access. In some examples, the allocation component 735 may be configured as or otherwise support a means for allocating the data flow associated with the multiple access PDU session based on the identified first data flow allocation percentage for the first access link associated with the first type of access and the identified second data flow allocation percentage for the second access link associated with the first type of access. In some examples, the first data flow allocation percentage is greater than or equal to the second data flow allocation percentage. In some examples, the first data flow allocation percentage is less than or equal to the second data flow allocation percentage.

In some examples, the link component 745 may be configured as or otherwise support a means for determining a first access link and a second access link of the set of multiple access links associated with the second type of access based on the received control signaling. In some examples, the allocation component 735 may be configured as or otherwise support a means for identifying, based on the configuration, a first data flow allocation percentage for the first access link associated with the second type of access and a second data flow allocation percentage for the second access link associated with the second type of access. In some examples, the allocation component 735 may be configured as or otherwise support a means for allocating the data flow associated with the multiple access PDU session based on the identified first data flow allocation percentage for the first access link associated with the second type of access and the identified second data flow allocation percentage for the second access link associated with the second type of access. In some examples, the first data flow allocation percentage is greater than or equal to the second data flow allocation percentage. In some examples, the first data flow allocation percentage is less than or equal to the second data flow allocation percentage.

In some examples, the link component 745 may be configured as or otherwise support a means for determining, based on the received control signaling, a first access link associated with the first type of access, and a second access link and a third access link associated with the second type of access. In some examples, the allocation component 735 may be configured as or otherwise support a means for identifying, based on the configuration, a first data flow allocation percentage for the first access link associated with the first type of access, a second data flow allocation percentage for the second access link associated with the second type of access, and a third data flow allocation percentage for the third access link associated with the second type of access. In some examples, the allocation component 735 may be configured as or otherwise support a means for allocating the data flow associated with the multiple access PDU session based on the identified first data flow allocation percentage, the second identified data flow allocation percentage, and the identified third data flow allocation percentage.

In some examples, the first data flow allocation percentage is greater than or equal to the second data flow allocation percentage or the third data flow allocation percentage. In some examples, the first data flow allocation percentage is less than or equal to the second data flow allocation percentage or the third data flow allocation percentage. In some examples, the second data flow allocation percentage is greater than or equal to the first data flow allocation percentage or the third data flow allocation percentage. In some examples, the second data flow allocation percentage is less than or equal to the first data flow allocation percentage or the third data flow allocation percentage. In some examples, the third data flow allocation percentage is greater than or equal to the first data flow allocation percentage or the second data flow allocation percentage. In some examples, the third data flow allocation percentage is less than or equal to the first data flow allocation percentage or the second data flow allocation percentage.

In some examples, the link component 745 may be configured as or otherwise support a means for determining, based on the received control signaling, a first access link or a second access link, or both, associated with the first type of access. In some examples, the priority component 755 may be configured as or otherwise support a means for determining that the first access link or the second access link, or both, associated with the first type of access includes a high priority. In some examples, the allocation component 735 may be configured as or otherwise support a means for allocating the data flow associated with the multiple access PDU session based on the first access link or the second access link, or both, associated with the first type of access including the high priority.

In some examples, the link component 745 may be configured as or otherwise support a means for determining, based on the received control signaling, a first access link or a second access link, or both, associated with the second type of access. In some examples, the priority component 755 may be configured as or otherwise support a means for determining that the first access link or the second access link, or both, associated with the second type of access includes a high priority. In some examples, the allocation component 735 may be configured as or otherwise support a means for allocating the data flow associated with the multiple access PDU session based on the first access link or the second access link, or both, associated with the second type of access including the high priority. In some examples, the configuration is received from a SMF. In some examples, the configuration includes a set of ATSSS rules.

Figure 8:
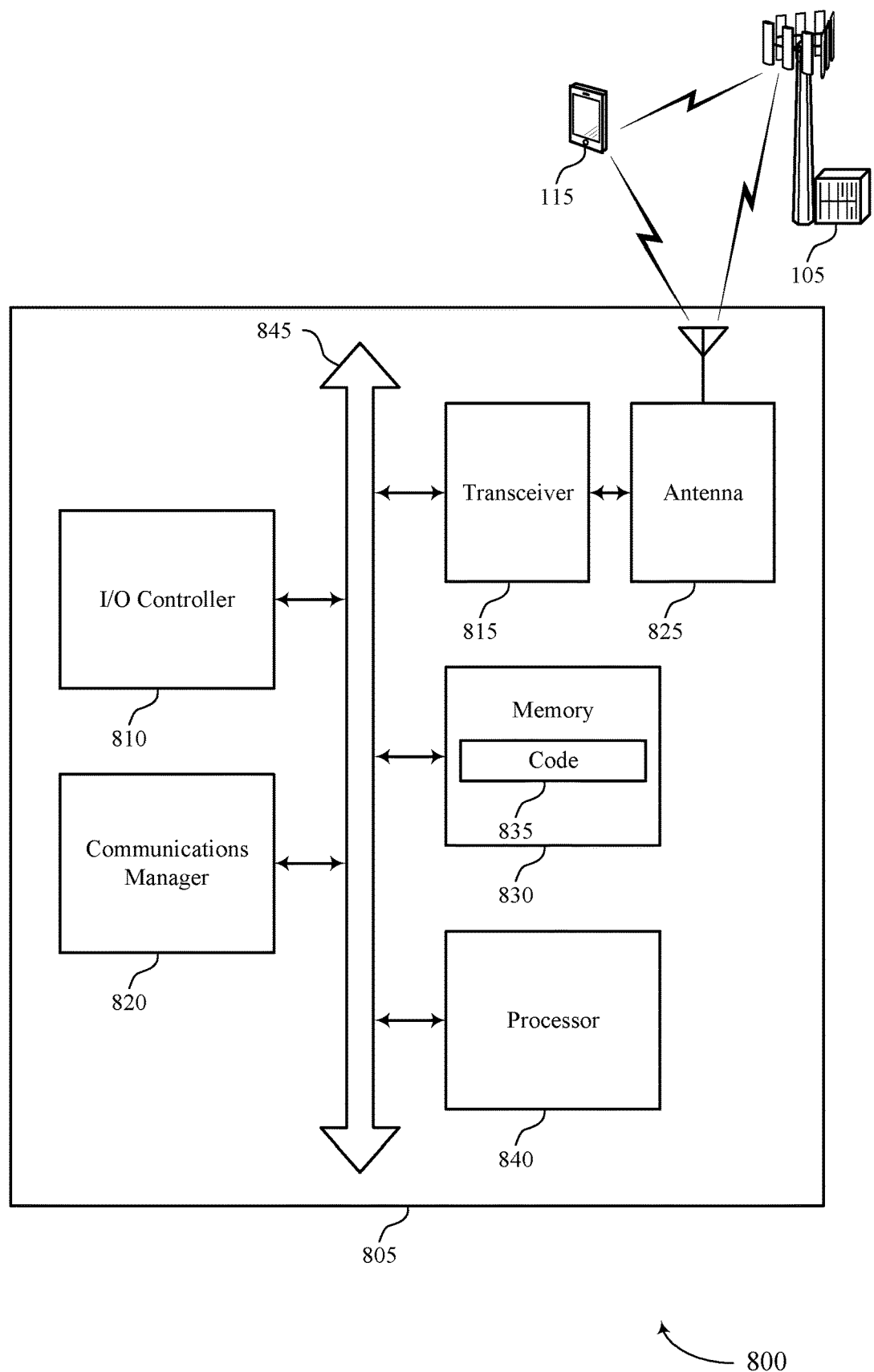
FIG. 8 shows a diagram of a system including a device that supports techniques for managing access combinations for multiple access PDU sessions in accordance with various aspects of the present disclosure.

FIG. 8 shows a diagram of a system 800 including a device 805 that supports techniques for managing access combinations for multiple access PDU sessions in accordance with various aspects of the present disclosure. The device 805 may be an example of or include the components of a device 505, a device 605, or a UE 115 as described herein. The device 805 may communicate (e.g., via wireless or wireline communication links) with network equipment, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wireline, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing access combinations for multiple access PDU sessions). For example, the device 805 or a component of the device 805 may include a processor 840 and memory 830 coupled with or to the processor 840, the processor 840 and memory 830 configured to perform various functions described herein.

The communications manager 820 may support wireless communication at a device 805 in accordance with examples as disclosed herein. For example, the communications manager 820 may be configured as or otherwise support a means for receiving control signaling indicating a configuration for a multiple access PDU session associated with a set of multiple access links, the set of multiple access links associated with a first type of access, a second type of access, or a combination thereof. The communications manager 820 may be configured as or otherwise support a means for selecting a mode for allocation of a data flow associated with the multiple access PDU session to the set of multiple access links based on the received control signaling. The communications manager 820 may be configured as or otherwise support a means for allocating the data flow associated with the multiple access PDU session to the set of multiple access links based on the selected mode. The communications manager 820 may be configured as or otherwise support a means for transmitting the allocated data flow over the set of multiple access links associated with the two types of access.

By including or configuring the communications manager 820 in accordance with examples as described herein, the device 805 may support techniques for reduced latency and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing access combinations for multiple access PDU sessions as described herein, or the processor 840 and the memory 830 may be otherwise configured to perform or support such operations.

Figure 9:
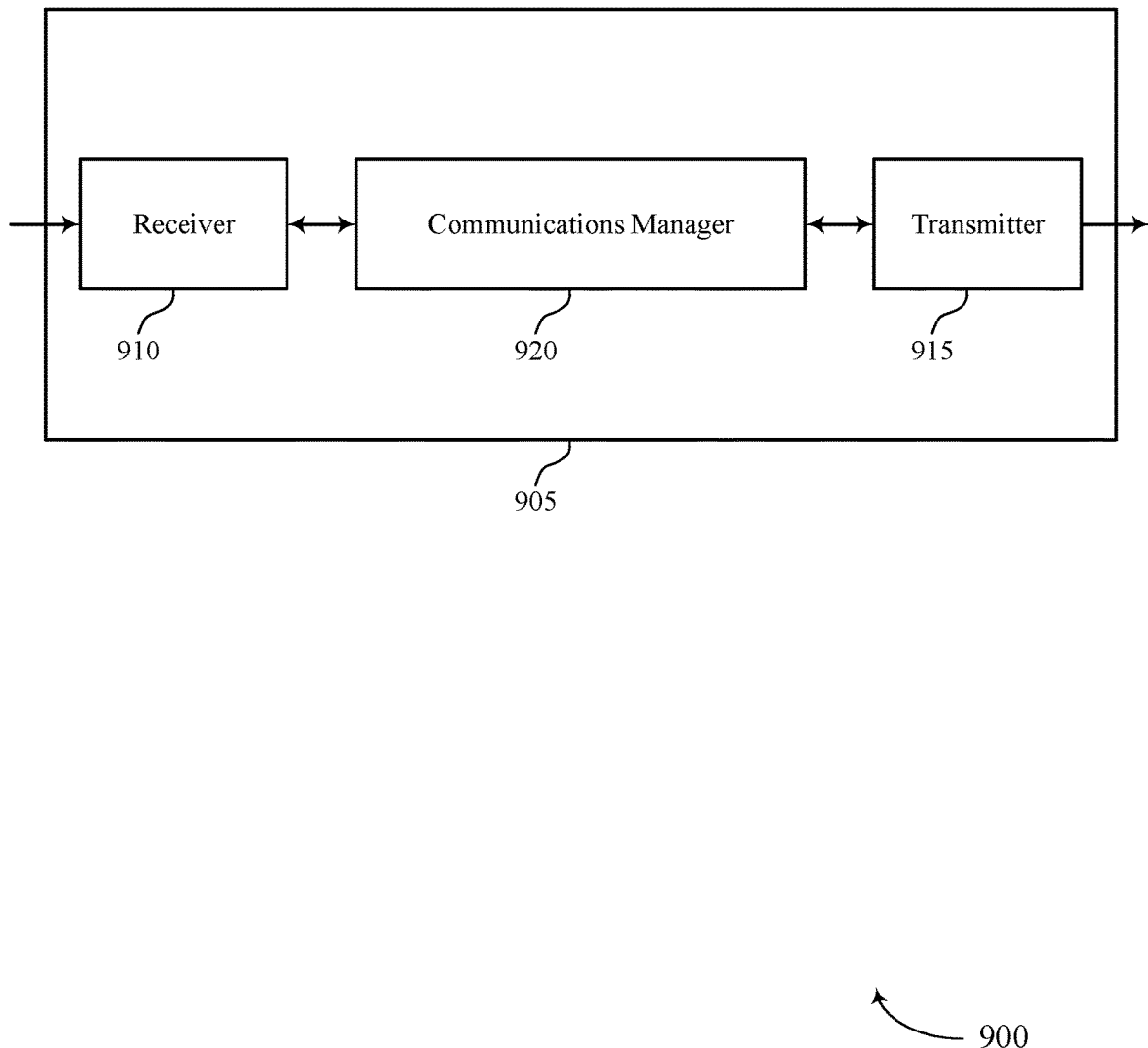
FIGS. 9 and 10 show block diagrams of devices that support techniques for managing access combinations for multiple access PDU sessions in accordance with various aspects of the present disclosure.

FIG. 9 shows a block diagram 900 of a device 905 that supports techniques for managing access combinations for multiple access PDU sessions in accordance with various aspects of the present disclosure. The device 905 may be an example of aspects of a network equipment (e.g., a UPF or an SMF) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing access combinations for multiple access PDU sessions). Information may be passed on to other components of the device 905.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing access combinations for multiple access PDU sessions). In some examples, the transmitter 915 may be co-located with a receiver 910 in a transceiver module.

The communications manager 920, the receiver 910, the transmitter 915, or various combinations thereof or various components thereof may be examples of means for performing various aspects of techniques for managing access combinations for multiple access PDU sessions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support communication at a network entity (e.g., a network entity associated with a core network) in accordance with examples as disclosed herein. For example, the communications manager 920 may be configured as or otherwise support a means for transmitting control signaling indicating a configuration for a multiple access PDU session associated with a set of multiple access links, the set of multiple access links associated with a first type of access, a second type of access, or a combination thereof. The communications manager 920 may be configured as or otherwise support a means for receiving allocated data flow over the set of multiple access links associated with the two types of access based on the transmitted control signaling.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources.

Figure 10:
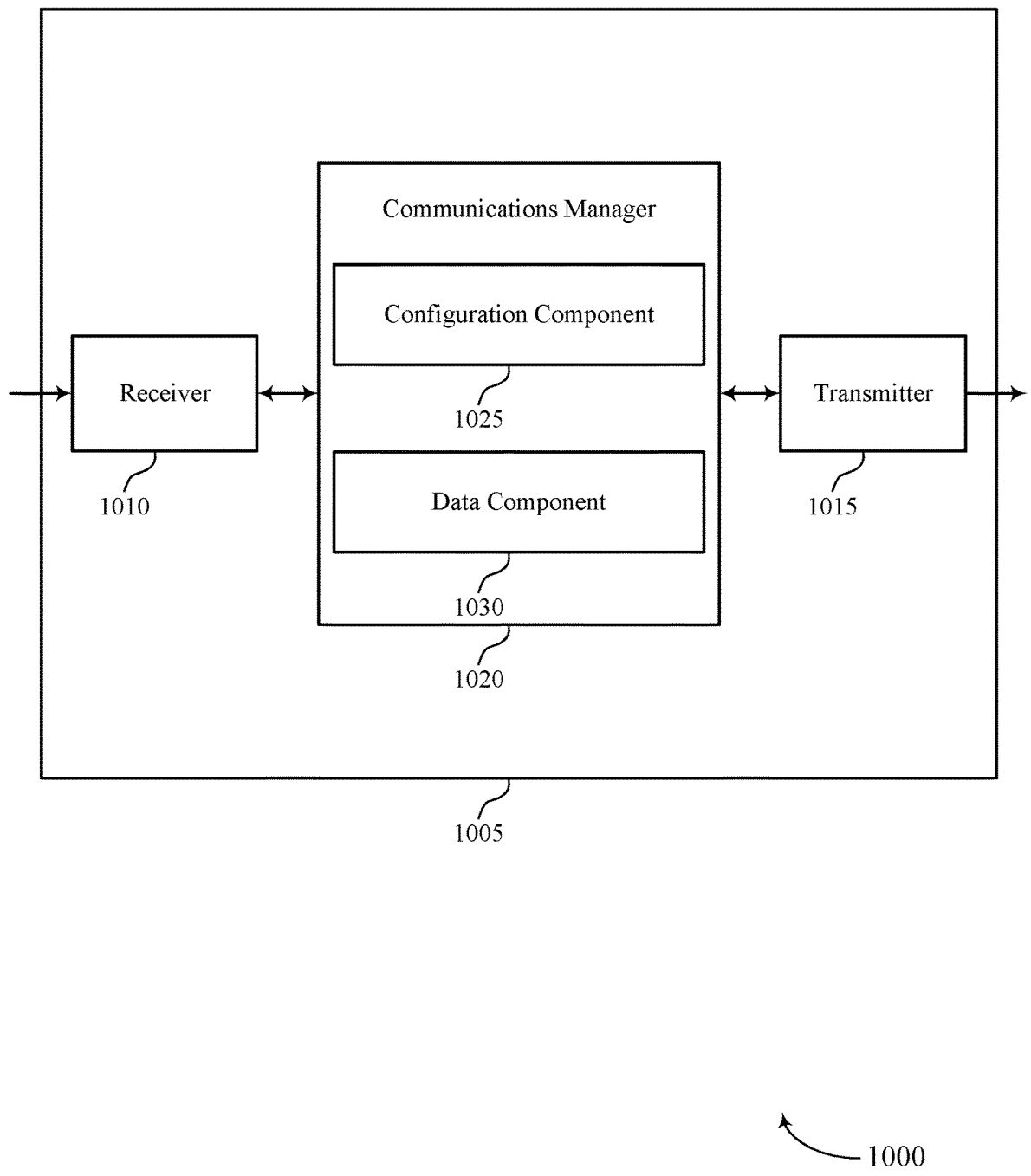

FIG. 10 shows a block diagram 1000 of a device 1005 that supports techniques for managing access combinations for multiple access PDU sessions in accordance with various aspects of the present disclosure. The device 1005 may be an example of aspects of a device 905 or other network equipment as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing access combinations for multiple access PDU sessions). Information may be passed on to other components of the device 1005.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing access combinations for multiple access PDU sessions). In some examples, the transmitter 1015 may be co-located with a receiver 1010 in a transceiver module.

The device 1005, or various components thereof, may be an example of means for performing various aspects of techniques for managing access combinations for multiple access PDU sessions as described herein. For example, the communications manager 1020 may include a configuration component 1025 a data component 1030, or any combination thereof. The communications manager 1020 may be an example of aspects of a communications manager 820 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support communication at a network entity in accordance with examples as disclosed herein. The configuration component 1025 may be configured as or otherwise support a means for transmitting control signaling indicating a configuration for a multiple access PDU session associated with a set of multiple access links, the set of multiple access links associated with a first type of access, a second type of access, or a combination thereof. The data component 1030 may be configured as or otherwise support a means for receiving allocated data flow over the set of multiple access links associated with the two types of access based on the transmitted control signaling.

Figure 11:
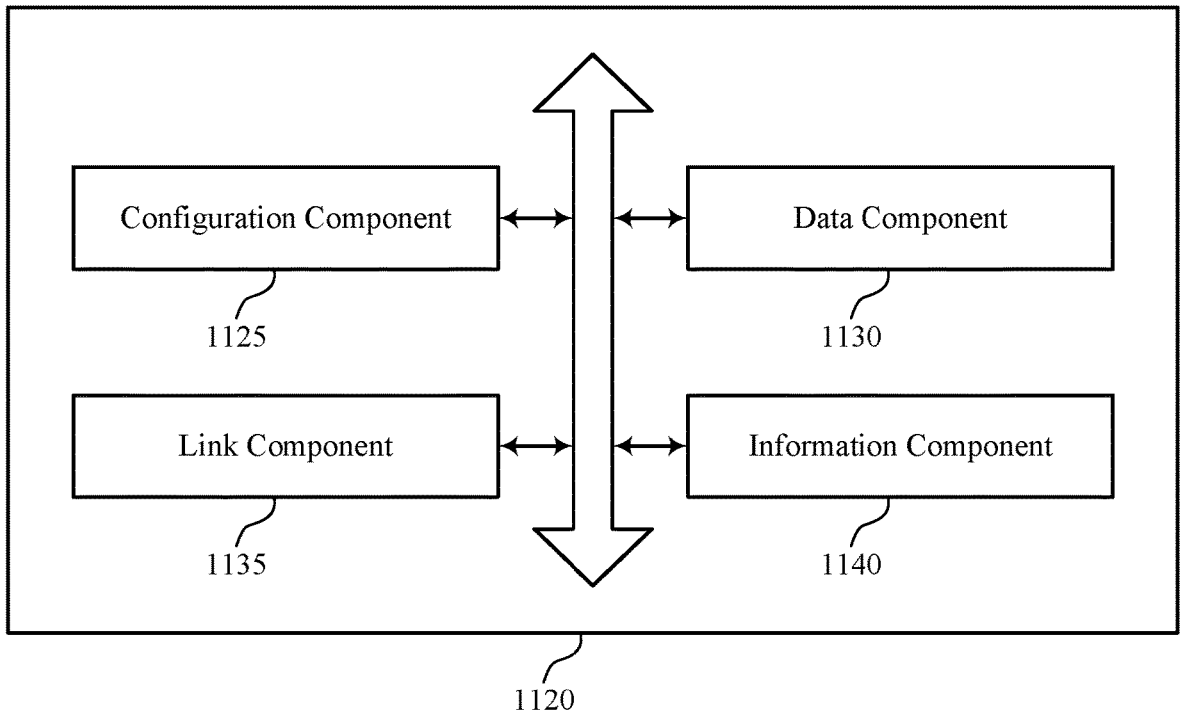
FIG. 11 shows a block diagram of a communications manager that supports techniques for managing access combinations for multiple access PDU sessions in accordance with various aspects of the present disclosure.

FIG. 11 shows a block diagram 1100 of a communications manager 1120 that supports techniques for managing access combinations for multiple access PDU sessions in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing access combinations for multiple access PDU sessions as described herein. For example, the communications manager 1120 may include a configuration component 1125, a data component 1130, a link component 1135, an information component 1140, or any combination thereof. Each of these components may communicate, directly or indirectly, with one another (e.g., via one or more buses).

The communications manager 1120 may support communication at a network entity in accordance with examples as disclosed herein. The configuration component 1125 may be configured as or otherwise support a means for transmitting control signaling indicating a configuration for a multiple access PDU session associated with a set of multiple access links, the set of multiple access links associated with a first type of access, a second type of access, or a combination thereof. The data component 1130 may be configured as or otherwise support a means for receiving allocated data flow over the set of multiple access links associated with the two types of access based on the transmitted control signaling. In some examples, the configuration includes indication of which forwarding action information (FAI) information elements (IEs) associated with the set of multiple access links need to be used.

In some examples, the link component 1135 may be configured as or otherwise support a means for determining a first access link and a second access link of the set of multiple access links associated with the first type of access. In some examples, the information component 1140 may be configured as or otherwise support a means for determining first FAI associated with the first access link and second FAI associated with the second access link. In some examples, the configuration component 1125 may be configured as or otherwise support a means for transmitting the control signaling indicating the configuration for the multiple access PDU session based on the first FAI associated with the first access link and second FAI associated with the second access link.

In some examples, the link component 1135 may be configured as or otherwise support a means for determining a first access link and a second access link of the set of multiple access links associated with the second type of access. In some examples, the information component 1140 may be configured as or otherwise support a means for determining first FAI associated with the first access link and second FAI associated with the second access link. In some examples, the configuration component 1125 may be configured as or otherwise support a means for transmitting the control signaling indicating the configuration for the multiple access PDU session based on the first FAI associated with the first access link and second FAI associated with the second access link.

In some examples, the link component 1135 may be configured as or otherwise support a means for determining a first access link of the set of multiple access links associated with the first type of access and a second access link and a third access link of the set of multiple access links associated with the second type of access. In some examples, the information component 1140 may be configured as or otherwise support a means for determining first FAI associated with the first access link, second FAI associated with the second access link, and third FAI associated with the third access link. In some examples, the configuration component 1125 may be configured as or otherwise support a means for transmitting the control signaling indicating the configuration for the multiple access PDU session based on the first FAI associated with the first access link, second FAI associated with the second access link, and third FAI associated with the third access link.

Figure 12:
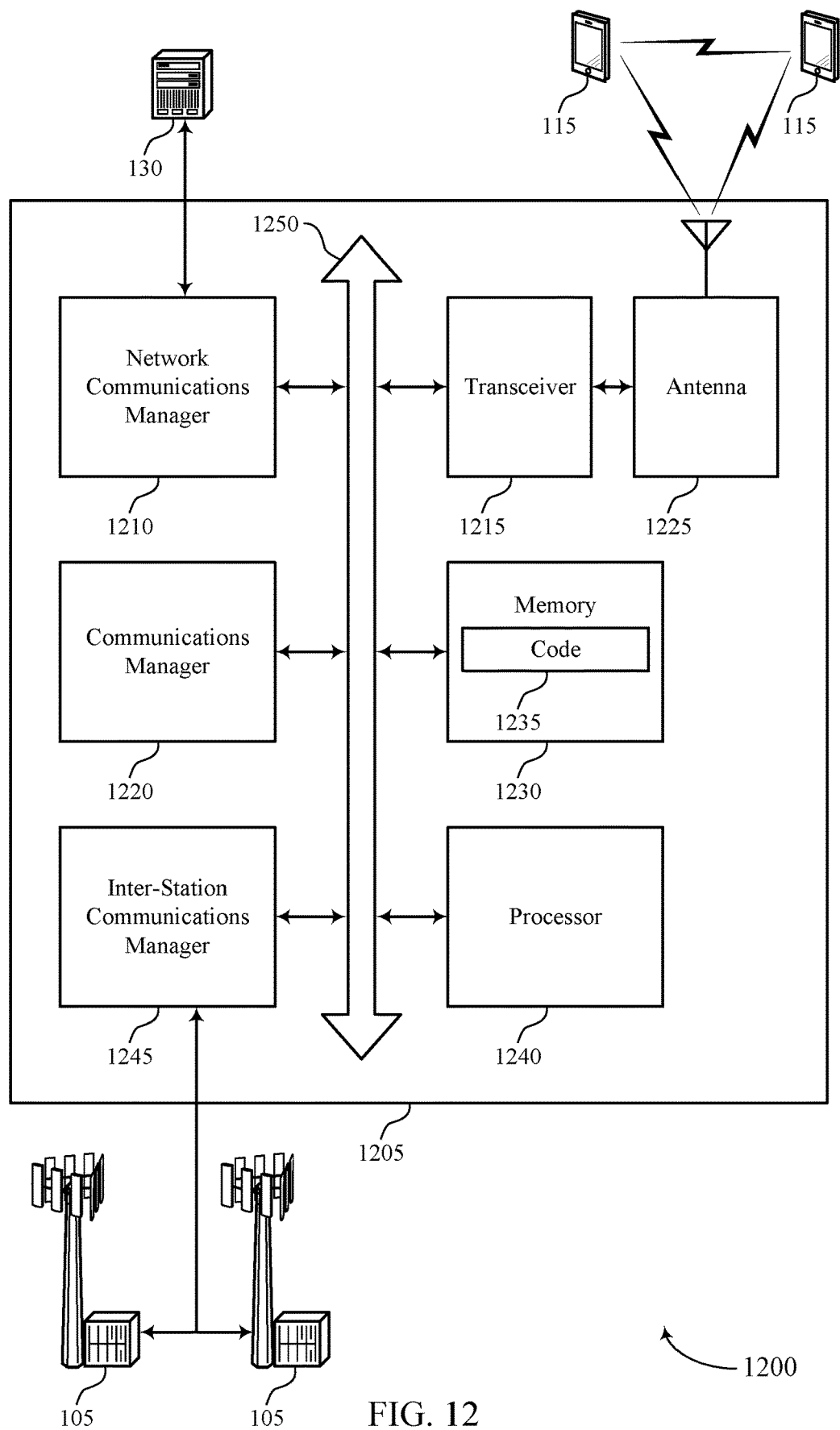
FIG. 12 shows a diagram of a system including a device that supports techniques for managing access combinations for multiple access PDU sessions in accordance with various aspects of the present disclosure.

FIG. 12 shows a diagram of a system 1200 including a device 1205 that supports techniques for managing access combinations for multiple access PDU sessions in accordance with various aspects of the present disclosure. The device 1205 may be an example of or include the components of a device 805, a device 1005, or other network equipment (e.g., core network nodes, network functions, relay devices, or other network equipment) as described herein. The device 1205 may communicate (e.g., via wireline or wireless communication links) with network equipment, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wireline backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wireline, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing access combinations for multiple access PDU sessions). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other network equipment, and may include a controller or scheduler for controlling communications with UEs 115 in cooperation with other network equipment. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network equipment.

The communications manager 1220 may support communication (e.g., wireless or wireline communication) at a network equipment (e.g., the device 1205) in accordance with examples as disclosed herein. For example, the communications manager 1220 may be configured as or otherwise support a means for transmitting control signaling indicating a configuration for a multiple access PDU session associated with a set of multiple access links, the set of multiple access links associated with a first type of access, a second type of access, or a combination thereof. The communications manager 1220 may be configured as or otherwise support a means for receiving allocated data flow over the set of multiple access links associated with the two types of access based on the transmitted control signaling.

By including or configuring the communications manager 1220 in accordance with examples as described herein, the device 1205 may support techniques for improved communication reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing access combinations for multiple access PDU sessions as described herein, or the processor 1240 and the memory 1230 may be otherwise configured to perform or support such operations.

Figure 13:
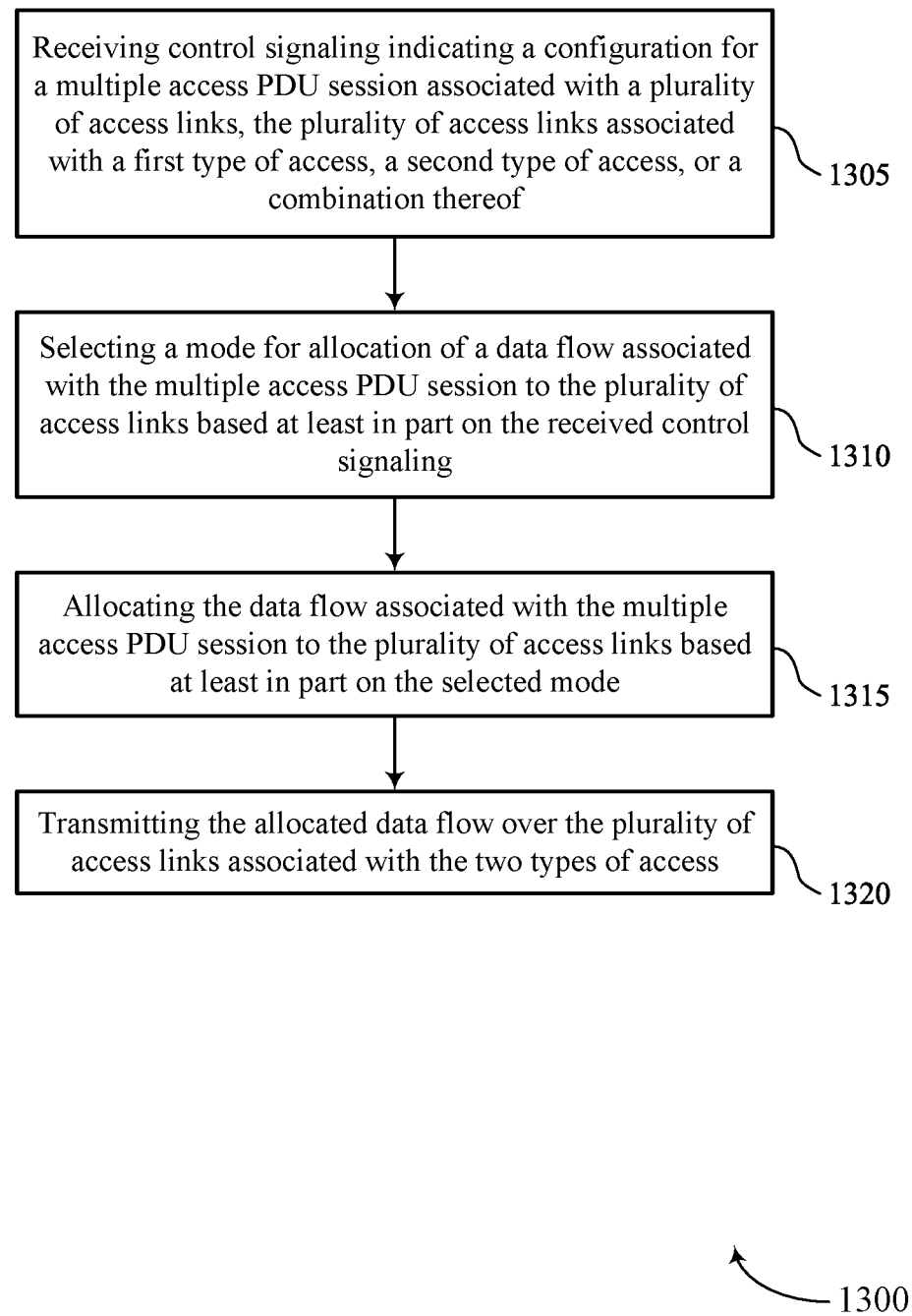
FIGS. 13 through 18 show flowcharts illustrating methods that support techniques for managing access combinations for multiple access PDU sessions in accordance with various aspects of the present disclosure.

FIG. 13 shows a flowchart illustrating a method 1300 that supports techniques for managing access combinations for multiple access PDU sessions in accordance with various aspects of the present disclosure. The operations of the method 1300 may be implemented by a UE or its components as described herein. For example, the operations of the method 1300 may be performed by a UE as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 1305, the method may include receiving control signaling indicating a configuration for a multiple access PDU session associated with a set of multiple access links, the set of multiple access links associated with a first type of access, a second type of access, or a combination thereof. The operations of 1305 may be performed in accordance with examples as disclosed herein. In some examples, aspects of the operations of 1305 may be performed by a configuration component 725 as described with reference to FIG. 7.

At 1310, the method may include selecting a mode for allocation of a data flow associated with the multiple access PDU session to the set of multiple access links based on the received control signaling. The operations of 1310 may be performed in accordance with examples as disclosed herein. In some examples, aspects of the operations of 1310 may be performed by a mode component 730 as described with reference to FIG. 7.

At 1315, the method may include allocating the data flow associated with the multiple access PDU session to the set of multiple access links based on the selected mode. The operations of 1315 may be performed in accordance with examples as disclosed herein. In some examples, aspects of the operations of 1315 may be performed by an allocation component 735 as described with reference to FIG. 7.

At 1320, the method may include transmitting the allocated data flow over the set of multiple access links associated with the two types of access. The operations of 1320 may be performed in accordance with examples as disclosed herein. In some examples, aspects of the operations of 1320 may be performed by a data component 740 as described with reference to FIG. 7.

Figure 14:
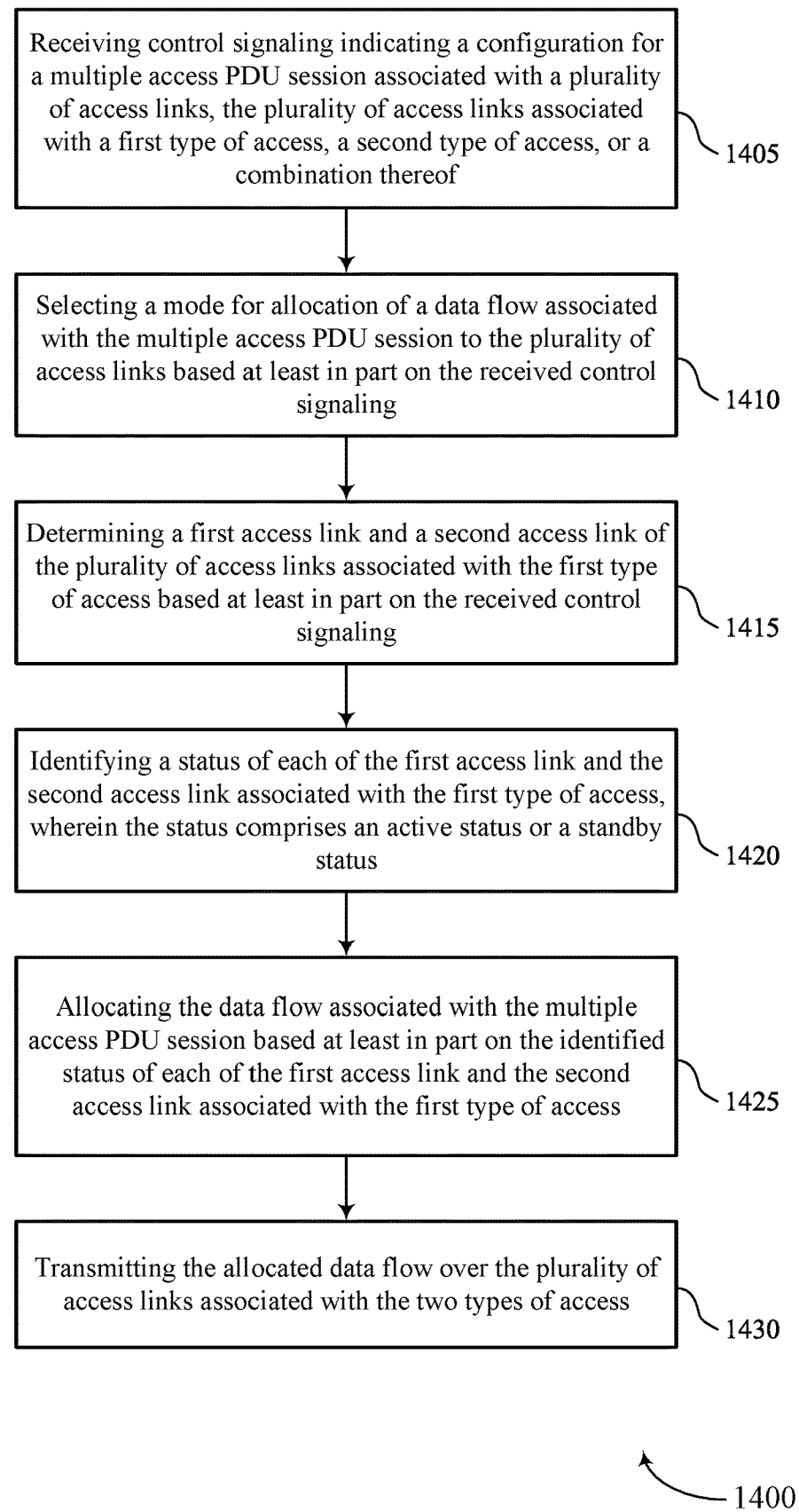

FIG. 14 shows a flowchart illustrating a method 1400 that supports techniques for managing access combinations for multiple access PDU sessions in accordance with various aspects of the present disclosure. The operations of the method 1400 may be implemented by a UE or its components as described herein. For example, the operations of the method 1400 may be performed by a UE as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1405, the method may include receiving control signaling indicating a configuration for a multiple access PDU session associated with a set of multiple access links, the set of multiple access links associated with a first type of access, a second type of access, or a combination thereof. The operations of 1405 may be performed in accordance with examples as disclosed herein. In some examples, aspects of the operations of 1405 may be performed by a configuration component 725 as described with reference to FIG. 7.

At 1410, the method may include selecting a mode for allocation of a data flow associated with the multiple access PDU session to the set of multiple access links based on the received control signaling. The operations of 1410 may be performed in accordance with examples as disclosed herein. In some examples, aspects of the operations of 1410 may be performed by a mode component 730 as described with reference to FIG. 7.

At 1415, the method may include determining a first access link and a second access link of the set of multiple access links associated with the first type of access based on the received control signaling. The operations of 1415 may be performed in accordance with examples as disclosed herein. In some examples, aspects of the operations of 1415 may be performed by a link component 745 as described with reference to FIG. 7.

At 1420, the method may include identifying a status of each of the first access link and the second access link associated with the first type of access, where the status includes an active status or a standby status. The operations of 1420 may be performed in accordance with examples as disclosed herein. In some examples, aspects of the operations of 1420 may be performed by a status component 750 as described with reference to FIG. 7.

At 1425, the method may include allocating the data flow associated with the multiple access PDU session based on the identified status of each of the first access link and the second access link associated with the first type of access. The operations of 1425 may be performed in accordance with examples as disclosed herein. In some examples, aspects of the operations of 1425 may be performed by an allocation component 735 as described with reference to FIG. 7.

At 1430, the method may include transmitting the allocated data flow over the set of multiple access links associated with the two types of access. The operations of 1430 may be performed in accordance with examples as disclosed herein. In some examples, aspects of the operations of 1430 may be performed by a data component 740 as described with reference to FIG. 7.

Figure 15:
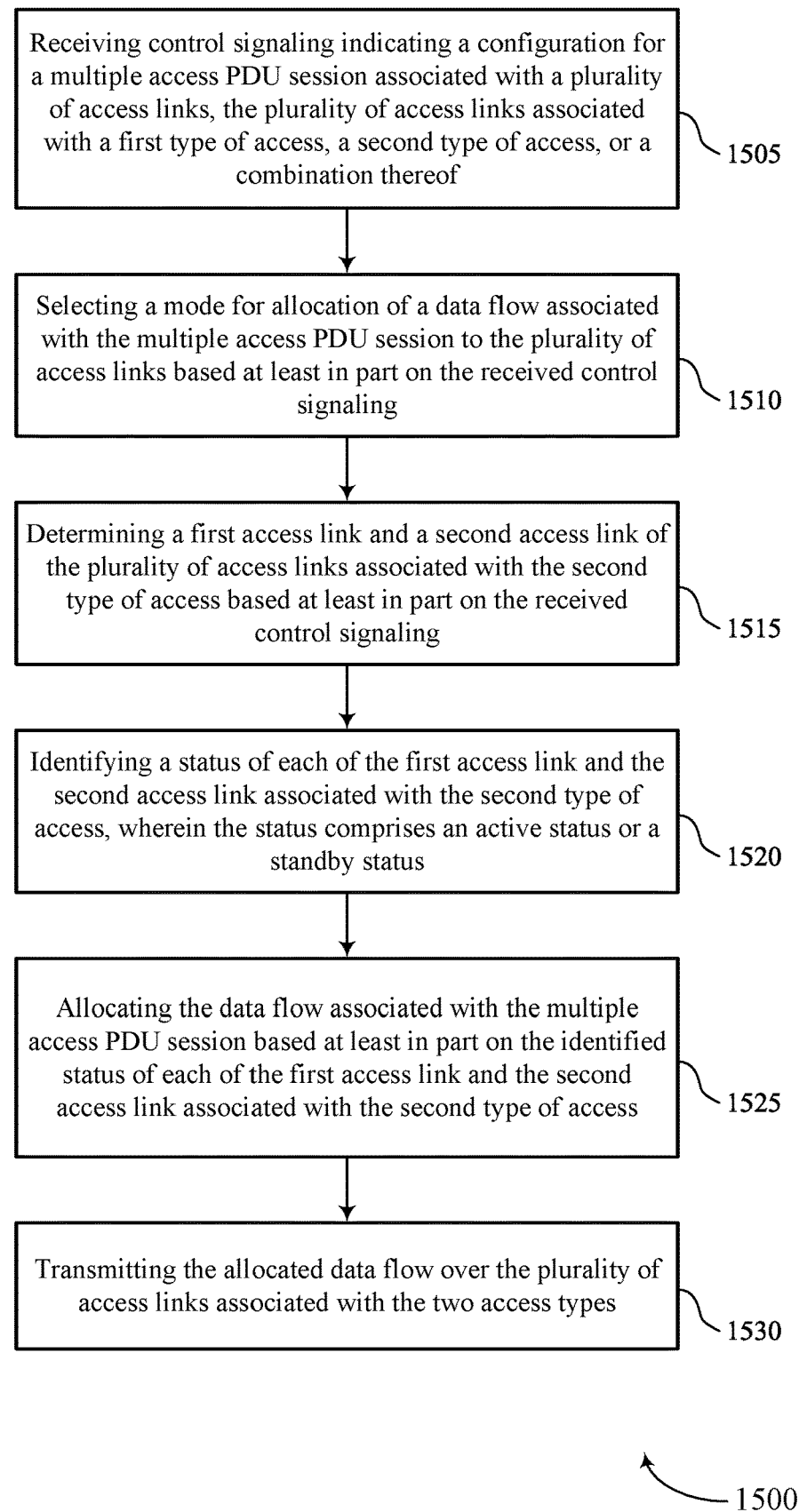

FIG. 15 shows a flowchart illustrating a method 1500 that supports techniques for managing access combinations for multiple access PDU sessions in accordance with various aspects of the present disclosure. The operations of the method 1500 may be implemented by a UE or its components as described herein. For example, the operations of the method 1500 may be performed by a UE as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1505, the method may include receiving control signaling indicating a configuration for a multiple access PDU session associated with a set of multiple access links, the set of multiple access links associated with a first type of access, a second type of access, or a combination thereof. The operations of 1505 may be performed in accordance with examples as disclosed herein. In some examples, aspects of the operations of 1505 may be performed by a configuration component 725 as described with reference to FIG. 7.

At 1510, the method may include selecting a mode for allocation of a data flow associated with the multiple access PDU session to the set of multiple access links based on the received control signaling. The operations of 1510 may be performed in accordance with examples as disclosed herein. In some examples, aspects of the operations of 1510 may be performed by a mode component 730 as described with reference to FIG. 7.

At 1515, the method may include determining a first access link and a second access link of the set of multiple access links associated with the second type of access based on the received control signaling. The operations of 1515 may be performed in accordance with examples as disclosed herein. In some examples, aspects of the operations of 1515 may be performed by a link component 745 as described with reference to FIG. 7.

At 1520, the method may include identifying a status of each of the first access link and the second access link associated with the second type of access, where the status includes an active status or a standby status. The operations of 1520 may be performed in accordance with examples as disclosed herein. In some examples, aspects of the operations of 1520 may be performed by a status component 750 as described with reference to FIG. 7.

At 1525, the method may include allocating the data flow associated with the multiple access PDU session based on the identified status of each of the first access link and the second access link associated with the second type of access. The operations of 1525 may be performed in accordance with examples as disclosed herein. In some examples, aspects of the operations of 1525 may be performed by an allocation component 735 as described with reference to FIG. 7.

At 1530, the method may include transmitting the allocated data flow over the set of multiple access links associated with the two types of access. The operations of 1530 may be performed in accordance with examples as disclosed herein. In some examples, aspects of the operations of 1530 may be performed by a data component 740 as described with reference to FIG. 7.

Figure 16:
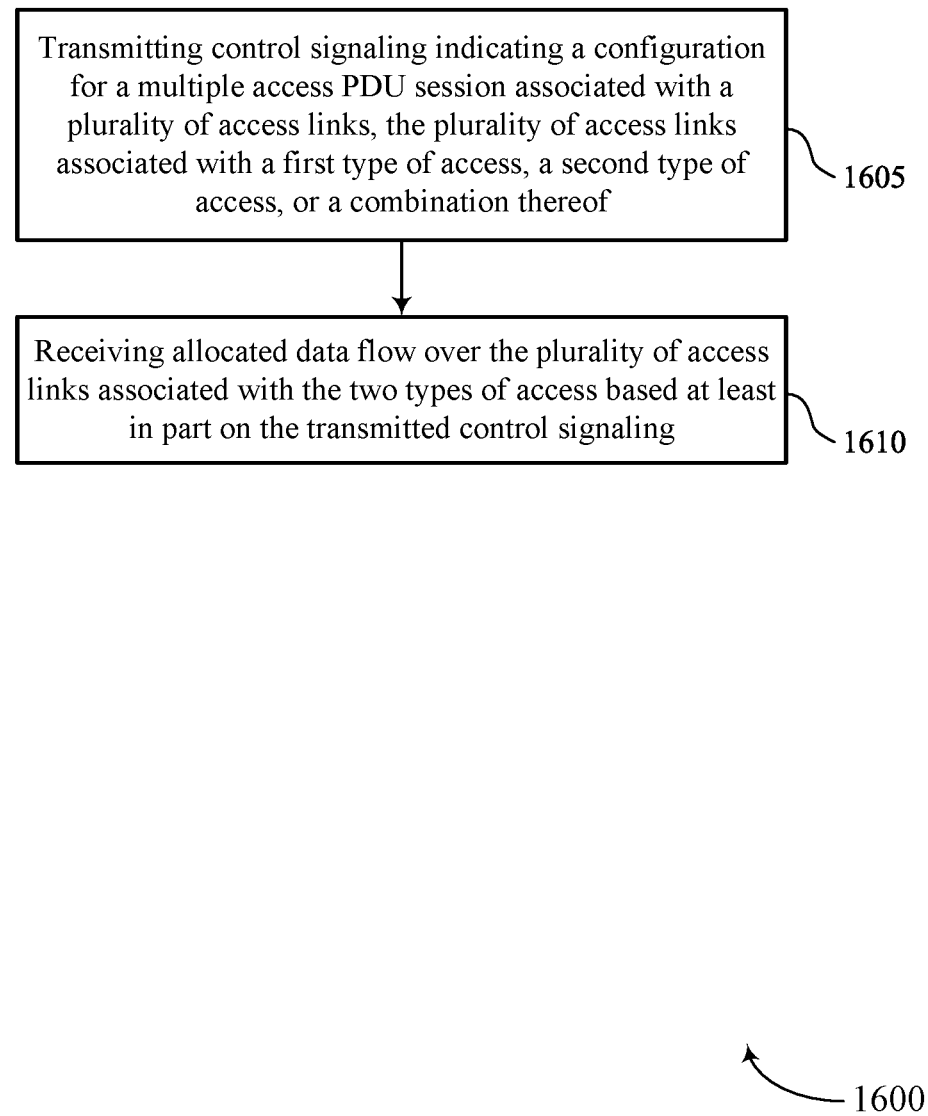

FIG. 16 shows a flowchart illustrating a method 1600 that supports techniques for managing access combinations for multiple access PDU sessions in accordance with various aspects of the present disclosure. The operations of the method 1600 may be implemented by a network entity or other network equipment (e.g., core network nodes, network functions, relay devices, or other network equipment) or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally or alternatively, the network entity may perform aspects of the described functions using special-purpose hardware.

At 1605, the method may include transmitting control signaling indicating a configuration for a multiple access PDU session associated with a set of multiple access links, the set of multiple access links associated with a first type of access, a second type of access, or a combination thereof. The operations of 1605 may be performed in accordance with examples as disclosed herein. In some examples, aspects of the operations of 1605 may be performed by a configuration component 1125 as described with reference to FIG. 11.

At 1610, the method may include receiving allocated data flow over the set of multiple access links associated with the two types of access based on the transmitted control signaling. The operations of 1610 may be performed in accordance with examples as disclosed herein. In some examples, aspects of the operations of 1610 may be performed by a data component 1130 as described with reference to FIG. 11.

Figure 17:
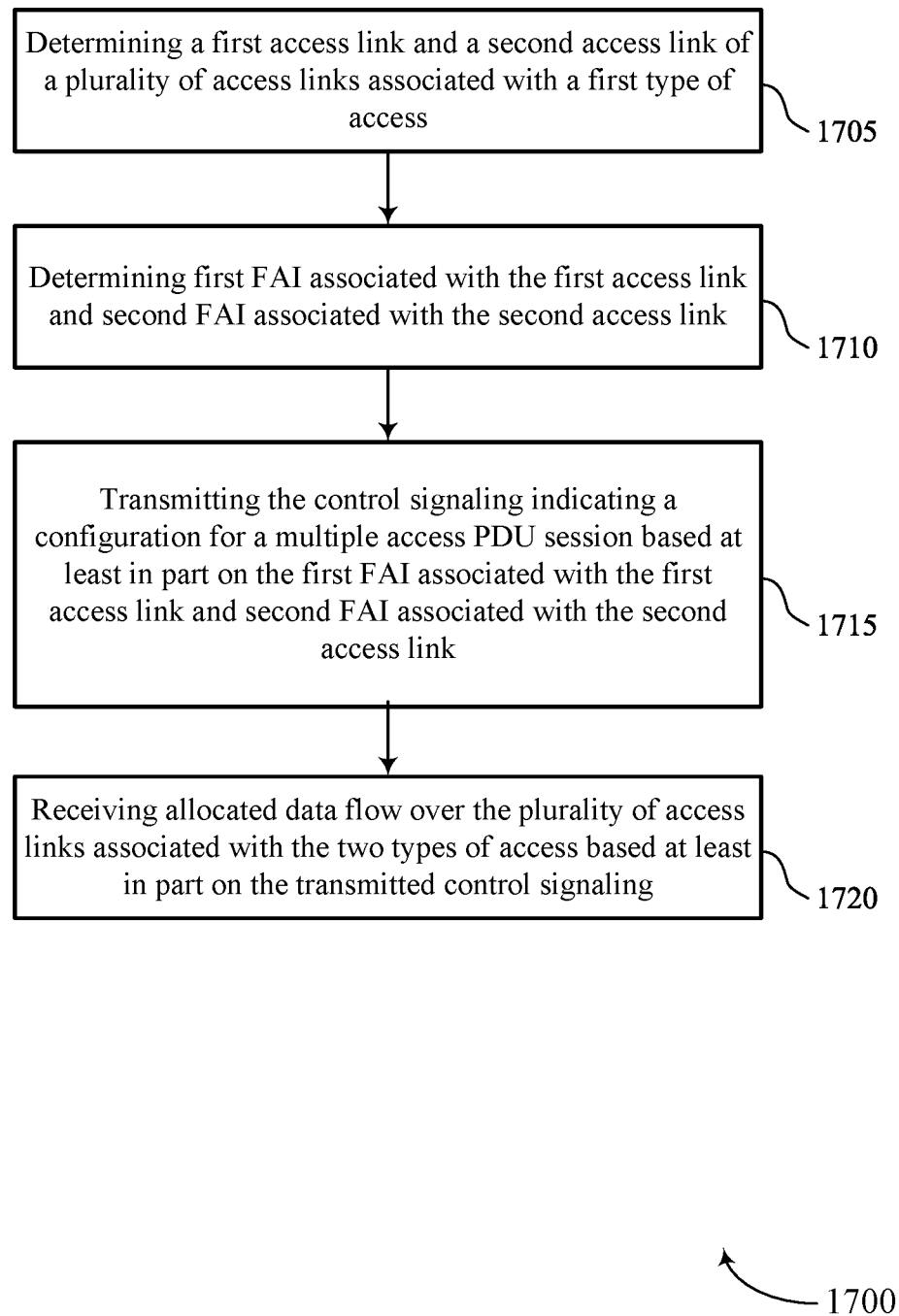

FIG. 17 shows a flowchart illustrating a method 1700 that supports techniques for managing access combinations for multiple access PDU sessions in accordance with various aspects of the present disclosure. The operations of the method 1700 may be implemented by a network entity or other network equipment (e.g., core network nodes, network functions, relay devices, or other network equipment) or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally or alternatively, a network entity may perform aspects of the described functions using special-purpose hardware.

At 1705, the method may include determining a first access link and a second access link of a set of multiple access links associated with a first type of access. The operations of 1705 may be performed in accordance with examples as disclosed herein. In some examples, aspects of the operations of 1705 may be performed by a link component 1135 as described with reference to FIG. 11.

At 1710, the method may include determining first FAI associated with the first access link and second FAI associated with the second access link. The operations of 1710 may be performed in accordance with examples as disclosed herein. In some examples, aspects of the operations of 1710 may be performed by an information component 1140 as described with reference to FIG. 11.

At 1715, the method may include transmitting control signaling indicating a configuration for a multiple access PDU session based on the first FAI associated with the first access link and second FAI associated with the second access link. The operations of 1715 may be performed in accordance with examples as disclosed herein. In some examples, aspects of the operations of 1715 may be performed by a configuration component 1125 as described with reference to FIG. 11.

At 1720, the method may include receiving allocated data flow over the set of multiple access links associated with the two types of access based on the transmitted control signaling. The operations of 1720 may be performed in accordance with examples as disclosed herein. In some examples, aspects of the operations of 1720 may be performed by a data component 1130 as described with reference to FIG. 11.

Figure 18:
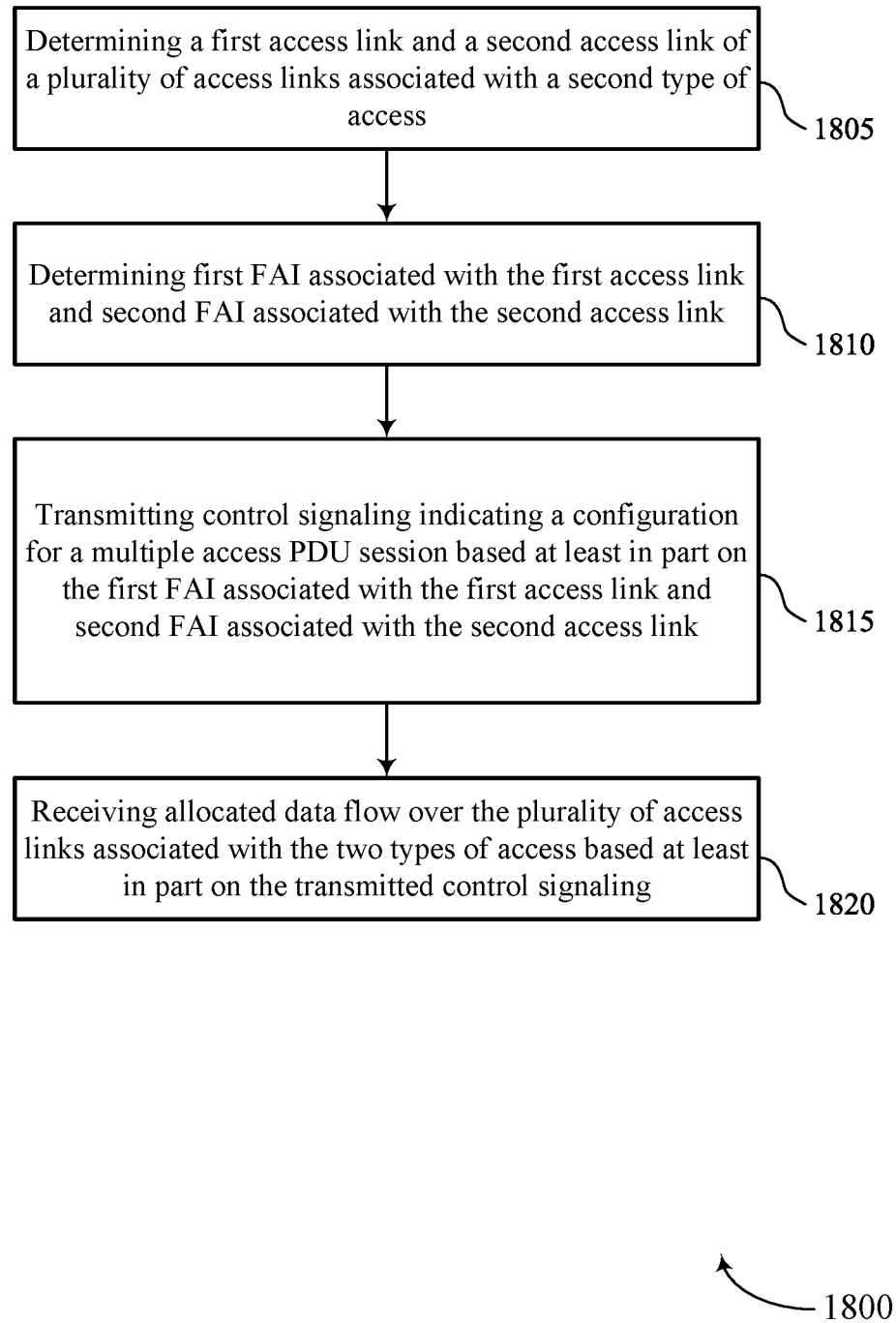

FIG. 18 shows a flowchart illustrating a method 1800 that supports techniques for managing access combinations for multiple access PDU sessions in accordance with various aspects of the present disclosure. The operations of the method 1800 may be implemented by a network entity or other network equipment (e.g., core network nodes, network functions, relay devices, or other network equipment) or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally or alternatively, a network entity may perform aspects of the described functions using special-purpose hardware.

At 1805, the method may include determining a first access link and a second access link of a set of multiple access links associated with a second type of access. The operations of 1805 may be performed in accordance with examples as disclosed herein. In some examples, aspects of the operations of 1805 may be performed by a link component 1135 as described with reference to FIG. 11.

At 1810, the method may include determining first FAI associated with the first access link and second FAI associated with the second access link. The operations of 1810 may be performed in accordance with examples as disclosed herein. In some examples, aspects of the operations of 1810 may be performed by an information component 1140 as described with reference to FIG. 11.

At 1815, the method may include transmitting control signaling indicating a configuration for a multiple access PDU session based on the first FAI associated with the first access link and second FAI associated with the second access link. The operations of 1815 may be performed in accordance with examples as disclosed herein. In some examples, aspects of the operations of 1815 may be performed by a configuration component 1125 as described with reference to FIG. 11.

At 1820, the method may include receiving allocated data flow over the set of multiple access links associated with the two types of access based on the transmitted control signaling. The operations of 1820 may be performed in accordance with examples as disclosed herein. In some examples, aspects of the operations of 1820 may be performed by a data component 1130 as described with reference to FIG. 11.

The following provides an overview of aspects of the present disclosure:

Aspect 1: A method for wireless communication at a device, comprising: receiving control signaling indicating a configuration for a multiple access PDU session associated with a plurality of access links, the plurality of access links associated with a first type of access, a second type of access, or a combination thereof; selecting a mode for allocation of a data flow associated with the multiple access PDU session to the plurality of access links based at least in part on the received control signaling; allocating the data flow associated with the multiple access PDU session to the plurality of access links based at least in part on the selected mode; and transmitting the allocated data flow over the plurality of access links associated with the two types of access.

Aspect 2: The method of aspect 1, further comprising: determining a first access link and a second access link of the plurality of access links associated with the first type of access based at least in part on the received control signaling; and identifying a status of each of the first access link and the second access link associated with the first type of access, wherein the status comprises an active status or a standby status, wherein allocating the data flow associated with the multiple access PDU session is further based at least in part on the identified status of each of the first access link and the second access link associated with the first type of access.

Aspect 3: The method of aspect 2, wherein the first access link or the second access link associated with the first type of access comprises the active status, and the method further comprising: determining a lack of a respective access link of the plurality of access links comprising the standby status.

Aspect 4: The method of any of aspects 2 through 3, wherein the first access link associated with the first type of access comprises the active status, and wherein the second access link associated with the first type of access comprises the standby status; or the second access link associated with the first type of access comprises the active status, and wherein the first access link associated with the first type of access comprises the standby status.

Aspect 5: The method of any of aspects 1 through 4, further comprising: determining a first access link and a second access link of the plurality of access links associated with the second type of access based at least in part on the received control signaling; and identifying a status of each of the first access link and the second access link associated with the second type of access, wherein the status comprises an active status or a standby status, wherein allocating the data flow associated with the multiple access PDU session is further based at least in part on the identified status of each of the first access link and the second access link associated with the second type of access.

Aspect 6: The method of aspect 5, wherein the first access link or the second access link associated with the second type of access comprises the active status, and the method further comprising: determining a lack of a respective access link of the plurality of access links comprising the standby status.

Aspect 7: The method of any of aspects 5 through 6, wherein the first access link associated with the second type of access comprises the active status, and wherein the second access link associated with the second type of access comprises the standby status; or the first access link associated with the second type of access comprises the active status, and wherein the second access link associated with the second type of access comprises the standby status.

Aspect 8: The method of any of aspects 1 through 7, further comprising: determining, based at least in part on the received control signaling, a first access link associated with the first type of access, and a second access link and a third access link associated with the second type of access; and identifying a status of each of the first access link associated with the first type of access and the second access link and the third access link associated with the second type of access, wherein the status comprises an active status or a standby status, wherein allocating the data flow associated with the multiple access PDU session is further based at least in part on the status of each the first access link, the second access link, and the third access link.

Aspect 9: The method of aspect 8, wherein the first access link associated with the first type of access comprises the active status, and the second access link or the third access link associated with the second type of access, or both comprise the standby status.

Aspect 10: The method of any of aspects 8 through 9, wherein the second access link associated with the second type of access comprises the active status, and the method further comprising: determining a lack of a respective access link of the plurality of access links comprising the standby status.

Aspect 11: The method of any of aspects 8 through 10, wherein the second access link associated with the second type of access comprises the active status, and the first access link associated with the first type of access or the third access link associated with the second type of access, or both comprise the standby status.

Aspect 12: The method of any of aspects 8 through 11, wherein the third access link associated with the second type of access comprises the active status, and the method further comprising: determining a lack of a respective access link of the plurality of access links comprising the standby status.

Aspect 13: The method of any of aspects 8 through 12, wherein the third access link associated with the second type of access comprises the active status, and the first access link associated with the first type of access or the second access link associated with the second type of access, or both comprise the standby status.

Aspect 14: The method of any of aspects 1 through 13, further comprising: determining a first access link and a second access link of the plurality of access links associated with the first type of access based at least in part on the received control signaling; and identifying, based at least in part on the configuration, a first data flow allocation percentage for the first access link associated with the first type of access and a second data flow allocation percentage for the second access link associated with the first type of access, wherein allocating the data flow associated with the multiple access PDU session is further based at least in part on the identified first data flow allocation percentage for the first access link associated with the first type of access and the identified second data flow allocation percentage for the second access link associated with the first type of access.

Aspect 15: The method of aspect 14, wherein the first data flow allocation percentage is greater than or equal to the second data flow allocation percentage; or the first data flow allocation percentage is less than or equal to the second data flow allocation percentage.

Aspect 16: The method of any of aspects 1 through 15, further comprising: determining a first access link and a second access link of the plurality of access links associated with the second type of access based at least in part on the received control signaling; and identifying, based at least in part on the configuration, a first data flow allocation percentage for the first access link associated with the second type of access and a second data flow allocation percentage for the second access link associated with the second type of access, wherein allocating the data flow associated with the multiple access PDU session is further based at least in part on the identified first data flow allocation percentage for the first access link associated with the second type of access and the identified second data flow allocation percentage for the second access link associated with the second type of access.

Aspect 17: The method of aspect 16, wherein the first data flow allocation percentage is greater than or equal to the second data flow allocation percentage; or the first data flow allocation percentage is less than or equal to the second data flow allocation percentage.

Aspect 18: The method of any of aspects 1 through 17, further comprising: determining, based at least in part on the received control signaling, a first access link associated with the first type of access, and a second access link and a third access link associated with the second type of access; and identifying, based at least in part on the configuration, a first data flow allocation percentage for the first access link associated with the first type of access, a second data flow allocation percentage for the second access link associated with the second type of access, and a third data flow allocation percentage for the third access link associated with the second type of access, wherein allocating the data flow associated with the multiple access PDU session is further based at least in part on the identified first data flow allocation percentage, the second identified data flow allocation percentage, and the identified third data flow allocation percentage.

Aspect 19: The method of aspect 18, wherein the first data flow allocation percentage is greater than or equal to the second data flow allocation percentage or the third data flow allocation percentage; the first data flow allocation percentage is less than or equal to the second data flow allocation percentage or the third data flow allocation percentage; the second data flow allocation percentage is greater than or equal to the first data flow allocation percentage or the third data flow allocation percentage; the second data flow allocation percentage is less than or equal to the first data flow allocation percentage or the third data flow allocation percentage; the third data flow allocation percentage is greater than or equal to the first data flow allocation percentage or the second data flow allocation percentage; or the third data flow allocation percentage is less than or equal to the first data flow allocation percentage or the second data flow allocation percentage.

Aspect 20: The method of any of aspects 1 through 19, further comprising: determining, based at least in part on the received control signaling, a first access link or a second access link, or both, associated with the first type of access; and determining that the first access link or the second access link, or both, associated with the first type of access comprises a high priority, wherein allocating the data flow associated with the multiple access PDU session is further based at least in part on the first access link or the second access link, or both, associated with the first type of access comprising the high priority.

Aspect 21: The method of any of aspects 1 through 20, further comprising: determining, based at least in part on the received control signaling, a first access link or a second access link, or both, associated with the second type of access; and determining that the first access link or the second access link, or both, associated with the second type of access comprises a high priority, wherein allocating the data flow associated with the multiple access PDU session is further based at least in part on the first access link or the second access link, or both, associated with the second type of access comprising the high priority.

Aspect 22: The method of any of aspects 1 through 21, wherein the configuration is received from a session management function (SMF).

Aspect 23: The method of any of aspects 1 through 22, wherein the configuration comprises a set of access traffic steering, switching, splitting (ATSSS) rules.

Aspect 24: A method for wireless communication at a network entity, comprising: transmitting control signaling indicating a configuration for a multiple access PDU session associated with a plurality of access links, the plurality of access links associated with a first type of access, a second type of access, or a combination thereof; and receiving allocated data flow over the plurality of access links associated with the two types of access based at least in part on the transmitted control signaling.

Aspect 25: The method of aspect 24, wherein the configuration comprises an information element indicating forwarding action information associated with the plurality of access links.

Aspect 26: The method of any of aspects 24 through 25, further comprising: determining a first access link and a second access link of the plurality of access links associated with the first type of access; and determining first forwarding action information associated with the first access link and second forwarding action information associated with the second access link, wherein transmitting the control signaling indicating the configuration for the multiple access PDU session is further based at least in part on the first forwarding action information associated with the first access link and second forwarding action information associated with the second access link.

Aspect 27: The method of any of aspects 24 through 26, further comprising: determining a first access link and a second access link of the plurality of access links associated with the second type of access; and determining first forwarding action information associated with the first access link and second forwarding action information associated with the second access link, wherein transmitting the control signaling indicating the configuration for the multiple access PDU session is further based at least in part on the first forwarding action information associated with the first access link and second forwarding action information associated with the second access link.

Aspect 28: The method of any of aspects 24 through 27, further comprising: determining a first access link of the plurality of access links associated with the first type of access and a second access link and a third access link of the plurality of access links associated with the second type of access; and determining first forwarding action information associated with the first access link, second forwarding action information associated with the second access link, and third forwarding action information associated with the third access link, wherein transmitting the control signaling indicating the configuration for the multiple access PDU session is further based at least in part on the first forwarding action information associated with the first access link, second forwarding action information associated with the second access link, and third forwarding action information associated with the third access link.

Aspect 29: An apparatus for wireless communication at a device, comprising a processor; memory coupled with the processor; and instructions stored in the memory and executable by the processor to cause the apparatus to perform a method of any of aspects 1 through 23.

Aspect 30: An apparatus for wireless communication at a device, comprising at least one means for performing a method of any of aspects 1 through 23.

Aspect 31: A non-transitory computer-readable medium storing code for wireless communication at a device, the code comprising instructions executable by a processor to perform a method of any of aspects 1 through 23.

Aspect 32: An apparatus for wireless communication at a network entity, comprising a processor; memory coupled with the processor; and instructions stored in the memory and executable by the processor to cause the apparatus to perform a method of any of aspects 24 through 28.

Aspect 33: An apparatus for wireless communication at a network entity, comprising at least one means for performing a method of any of aspects 24 through 28.

Aspect 34: A non-transitory computer-readable medium storing code for wireless communication at a network entity, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a network entity, control signaling indicating a configuration for a first multiple access protocol data unit session associated with a plurality of access links, the plurality of access links comprising at least two access links associated with a first type of access, at least two access links associated with a second type of access, or one access link associated with the first type of access and at least two access links associated with the second type of access;
selecting a mode for allocation of a data flow associated with the first multiple access protocol data unit session to the plurality of access links based at least in part on the received control signaling;
allocating the data flow associated with the first multiple access protocol data unit session to the plurality of access links based at least in part on the selected mode; and
transmitting the allocated data flow over the plurality of access links in accordance with the first multiple access protocol data unit session.

2. The method of claim 1, further comprising:
determining a first access link and a second access link of the plurality of access links associated with the first type of access based at least in part on the received control signaling; and
identifying a status of each of the first access link and the second access link associated with the first type of access, wherein the status comprises an active status or a standby status,
wherein allocating the data flow associated with the first multiple access protocol data unit session is further based at least in part on the identified status of each of the first access link and the second access link associated with the first type of access.

3. The method of claim 2, wherein the first access link or the second access link associated with the first type of access comprises the active status, and the method further comprising:
determining a lack of a respective access link of the plurality of access links comprising the standby status.

4. The method of claim 2, wherein:
the first access link associated with the first type of access comprises the active status, and wherein the second access link associated with the first type of access comprises the standby status; or
the second access link associated with the first type of access comprises the active status, and wherein the first access link associated with the first type of access comprises the standby status.

5. The method of claim 1, further comprising:
determining a first access link and a second access link of the plurality of access links associated with the second type of access based at least in part on the received control signaling; and
identifying a status of each of the first access link and the second access link associated with the second type of access, wherein the status comprises an active status or a standby status,
wherein allocating the data flow associated with the first multiple access protocol data unit session is further based at least in part on the identified status of each of the first access link and the second access link associated with the second type of access.

6. The method of claim 5, wherein the first access link or the second access link associated with the second type of access comprises the active status, and the method further comprising:
determining a lack of a respective access link of the plurality of access links comprising the standby status.

7. The method of claim 5, wherein:
the first access link associated with the second type of access comprises the active status, and wherein the second access link associated with the second type of access comprises the standby status; or
the first access link associated with the second type of access comprises the active status, and wherein the second access link associated with the second type of access comprises the standby status.

8. The method of claim 1, further comprising:
determining, based at least in part on the received control signaling, a first access link associated with the first type of access, and a second access link and a third access link associated with the second type of access; and
identifying a status of each of the first access link associated with the first type of access and the second access link and the third access link associated with the second type of access, wherein the status comprises an active status or a standby status,
wherein allocating the data flow associated with the first multiple access protocol data unit session is further based at least in part on the status of each the first access link, the second access link, and the third access link.

9. The method of claim 8, wherein the first access link associated with the first type of access comprises the active status, and wherein the second access link or the third access link associated with the second type of access, or both comprise the standby status.

10. The method of claim 8, wherein the second access link associated with the second type of access comprises the active status, and the method further comprising:
determining a lack of a respective access link of the plurality of access links comprising the standby status.

11. The method of claim 8, wherein the second access link associated with the second type of access comprises the active status, and wherein the first access link associated with the first type of access or the third access link associated with the second type of access, or both comprise the standby status.

12. The method of claim 8, wherein the third access link associated with the second type of access comprises the active status, and the method further comprising:
determining a lack of a respective access link of the plurality of access links comprising the standby status.

13. The method of claim 8, wherein the third access link associated with the second type of access comprises the active status, and wherein the first access link associated with the first type of access or the second access link associated with the second type of access, or both comprise the standby status.

14. The method of claim 1, further comprising:
determining a first access link and a second access link of the plurality of access links associated with the first type of access based at least in part on the received control signaling; and
identifying, based at least in part on the configuration, a first data flow allocation percentage for the first access link associated with the first type of access and a second data flow allocation percentage for the second access link associated with the first type of access,
wherein allocating the data flow associated with the first multiple access protocol data unit session is further based at least in part on the identified first data flow allocation percentage for the first access link associated with the first type of access and the identified second data flow allocation percentage for the second access link associated with the first type of access.

15. The method of claim 14, wherein:
the first data flow allocation percentage is greater than or equal to the second data flow allocation percentage; or
the first data flow allocation percentage is less than or equal to the second data flow allocation percentage.

16. The method of claim 1, further comprising:
determining a first access link and a second access link of the plurality of access links associated with the second type of access based at least in part on the received control signaling; and
identifying, based at least in part on the configuration, a first data flow allocation percentage for the first access link associated with the second type of access and a second data flow allocation percentage for the second access link associated with the second type of access,
wherein allocating the data flow associated with the first multiple access protocol data unit session is further based at least in part on the identified first data flow allocation percentage for the first access link associated with the second type of access and the identified second data flow allocation percentage for the second access link associated with the second type of access.

17. The method of claim 16, wherein:
the first data flow allocation percentage is greater than or equal to the second data flow allocation percentage; or
the first data flow allocation percentage is less than or equal to the second data flow allocation percentage.

18. The method of claim 1, further comprising:
determining, based at least in part on the received control signaling, a first access link associated with the first type of access, and a second access link and a third access link associated with the second type of access; and
identifying, based at least in part on the configuration, a first data flow allocation percentage for the first access link associated with the first type of access, a second data flow allocation percentage for the second access link associated with the second type of access, and a third data flow allocation percentage for the third access link associated with the second type of access,
wherein allocating the data flow associated with the first multiple access protocol data unit session is further based at least in part on the identified first data flow allocation percentage, the second identified data flow allocation percentage, and the identified third data flow allocation percentage.

19. The method of claim 18, wherein:
the first data flow allocation percentage is greater than or equal to the second data flow allocation percentage or the third data flow allocation percentage;
the first data flow allocation percentage is less than or equal to the second data flow allocation percentage or the third data flow allocation percentage;
the second data flow allocation percentage is greater than or equal to the first data flow allocation percentage or the third data flow allocation percentage;
the second data flow allocation percentage is less than or equal to the first data flow allocation percentage or the third data flow allocation percentage;
the third data flow allocation percentage is greater than or equal to the first data flow allocation percentage or the second data flow allocation percentage; or
the third data flow allocation percentage is less than or equal to the first data flow allocation percentage or the second data flow allocation percentage.

20. The method of claim 1, further comprising:
determining, based at least in part on the received control signaling, a first access link or a second access link, or both, associated with the first type of access; and
determining that the first access link or the second access link, or both, associated with the first type of access comprises a high priority,
wherein allocating the data flow associated with the first multiple access protocol data unit session is further based at least in part on the first access link or the second access link, or both, associated with the first type of access comprising the high priority.

21. The method of claim 1, further comprising:
determining, based at least in part on the received control signaling, a first access link or a second access link, or both, associated with the second type of access; and
determining that the first access link or the second access link, or both, associated with the second type of access comprises a high priority,
wherein allocating the data flow associated with the first multiple access protocol data unit session is further based at least in part on the first access link or the second access link, or both, associated with the second type of access comprising the high priority.

22. The method of claim 1, wherein the configuration is received from a session management function (SMF).

23. The method of claim 1, wherein the configuration comprises a set of access traffic steering, switching, splitting (ATSSS) rules.

24. A user equipment (UE) for wireless communication, comprising:
one or more memories storing processor-executable code; and
one or more processors coupled with the one or more memories and operable to cause the UE to:
receive, from a network entity, control signaling indicating a configuration for a first multiple access protocol data unit session associated with a plurality of access links, the plurality of access links comprising at least two access links associated with a first type of access, at least two access links associated with a second type of access, or one access link associated with the first type of access and at least two access links associated with the second type of access;
select a mode for allocation of a data flow associated with the first multiple access protocol data unit session to the plurality of access links based at least in part on the received control signaling;

allocate the data flow associated with the first multiple access protocol data unit session to the plurality of access links based at least in part on the selected mode; and transmit the allocated data flow over the plurality of access links in accordance with the first multiple access protocol data unit session.

25. The UE of claim 24, wherein the one or more processors are further operable to cause the UE to:

determine a first access link and a second access link of the plurality of access links associated with the first type of access based at least in part on the received control signaling; and identify a status of each of the first access link and the second access link associated with the first type of access, wherein the status comprises an active status or a standby status, wherein to allocate the data flow associated with the first multiple access protocol data unit session is further based at least in part on the identified status of each of the first access link and the second access link associated with the first type of access.

26. The UE of claim 25, wherein the first access link or the second access link associated with the first type of access comprises the active status, and wherein the one or more processors are further operable to cause the UE to:

determine a lack of a respective access link of the plurality of access links comprising the standby status.

27. The UE of claim 25, wherein:

the first access link associated with the first type of access comprises the active status, and wherein the second access link associated with the first type of access comprises the standby status; or the second access link associated with the first type of access comprises the active status, and wherein the first access link associated with the first type of access comprises the standby status.

28. The UE of claim 24, wherein the one or more processors are further operable to cause the UE to:

determine a first access link and a second access link of the plurality of access links associated with the second type of access based at least in part on the received control signaling; and identify a status of each of the first access link and the second access link associated with the second type of access, wherein the status comprises an active status or a standby status, wherein to allocate the data flow associated with the first multiple access protocol data unit session is further based at least in part on the identified status of each of the first access link and the second access link associated with the second type of access.

29. The UE of claim 28, wherein the first access link or the second access link associated with the second type of access comprises the active status, and wherein the one or more processors are further operable to cause the UE to:

determine a lack of a respective access link of the plurality of access links comprising the standby status.

30. The UE of claim 28, wherein:

the first access link associated with the second type of access comprises the active status, and wherein the second access link associated with the second type of access comprises the standby status; or the first access link associated with the second type of access comprises the active status, and wherein the second access link associated with the second type of access comprises the standby status.

* * * * *